(12) United States Patent
Taniguchi

(10) Patent No.: US 8,328,371 B2
(45) Date of Patent: Dec. 11, 2012

(54) ANTI-REFLECTION STRUCTURE BODY, METHOD OF PRODUCING THE SAME AND METHOD OF PRODUCING OPTICAL MEMBER

(75) Inventor: Jun Taniguchi, Toride (JP)

(73) Assignee: Tokyo University of Science Educational Foundation Administrative Organization, Tokyo (JP)

( * ) Notice: Subject to any disclaimer, the term of this patent is extended or adjusted under 35 U.S.C. 154(b) by 302 days.

(21) Appl. No.: 12/310,016

(22) PCT Filed: Aug. 9, 2007

(86) PCT No.: PCT/JP2007/065667
§ 371 (c)(1),
(2), (4) Date: Feb. 6, 2009

(87) PCT Pub. No.: WO2008/018570
PCT Pub. Date: Feb. 14, 2008

(65) Prior Publication Data
US 2009/0323189 A1    Dec. 31, 2009

(30) Foreign Application Priority Data

Aug. 9, 2006 (JP) .................................. 2006-217577
Feb. 20, 2007 (JP) .................................. 2007-039340

(51) Int. Cl.
*G02B 27/00* (2006.01)
(52) U.S. Cl. .................... 359/601; 359/599; 359/831
(58) Field of Classification Search .............. 359/599, 359/601–614, 831–837
See application file for complete search history.

(56) References Cited

U.S. PATENT DOCUMENTS

| 5,126,882 | A  | * | 6/1992  | Oe et al. ........................ 359/619 |
| 6,825,896 | B2 | * | 11/2004 | Goto et al. ..................... 349/65  |
| 6,861,790 | B1 | * | 3/2005  | Iwasa et al. ................... 313/346 R |
| 2003/0102286 | A1 |  | 6/2003 | Takahara et al. |
| 2006/0146571 | A1 | * | 7/2006 | Whitney ......................... 362/615 |

FOREIGN PATENT DOCUMENTS

| EP | 1211337 A   | 6/2002  |
| JP | 2000-215788 A | 8/2000  |
| JP | 2001-272505 | 10/2001 |
| JP | 2004-137105 | 5/2004  |
| JP | 2005-99707  | 4/2005  |
| JP | 2006-130841 | 5/2006  |

OTHER PUBLICATIONS

Japanese Office Action, dated Feb. 16, 2010, issued in corresponding JP Application No. 2007-208624.
Extended European Search Report issued in corresponding EP application No. 07792313.4.

* cited by examiner

*Primary Examiner* — Thong Nguyen
(74) *Attorney, Agent, or Firm* — SOLARIS Intellectual Property Group, PLLC

(57) ABSTRACT

An anti-reflection structure body comprises a base member which is made of glassy carbon and at a surface of which is formed an anti-reflection structure including a cluster of minute projections each having a diameter that contracts towards a tip thereof. The minute projections preferably have an average height of from 200 nm to 3000 nm and an average maximum diameter of from 50 nm to 300 nm, and an average pitch of from 50 nm to 300 nm. An anti-reflection structure body which is easily produced, capable of achieving an anti-reflection effect near to non-reflection, and capable of providing the minute structure even to a member having a high melting point such as quartz glass or the like by transfer or the like can be provided.

11 Claims, 21 Drawing Sheets

FIG. 2
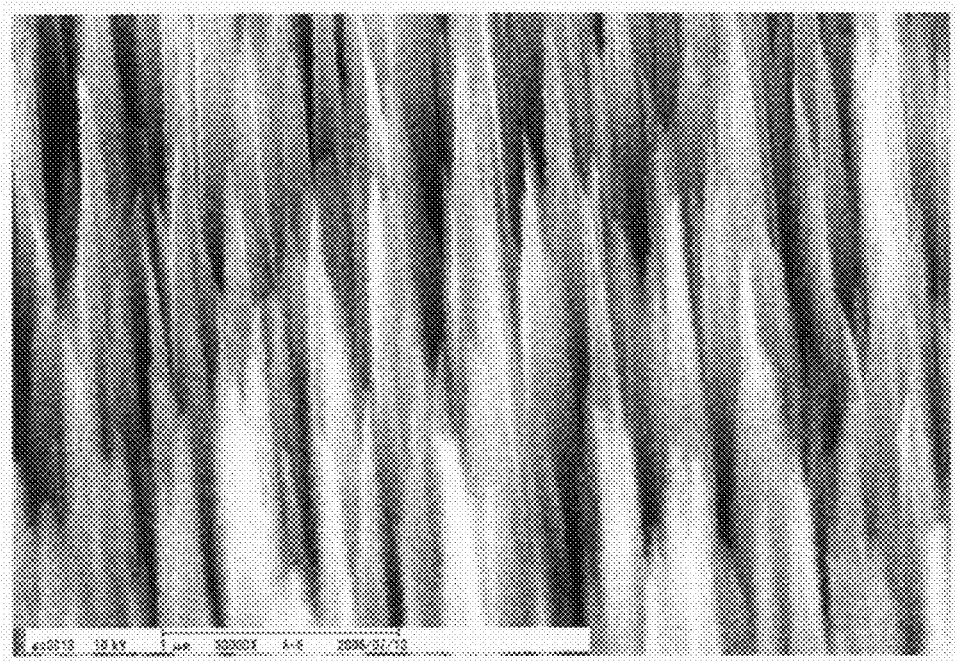
(A)
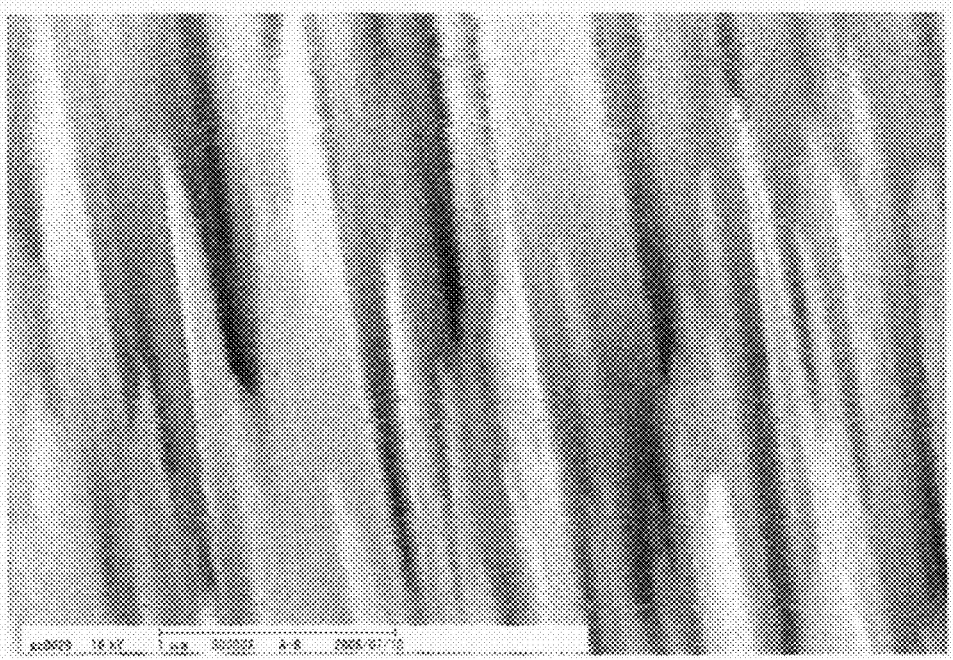
(B)

FIG. 3
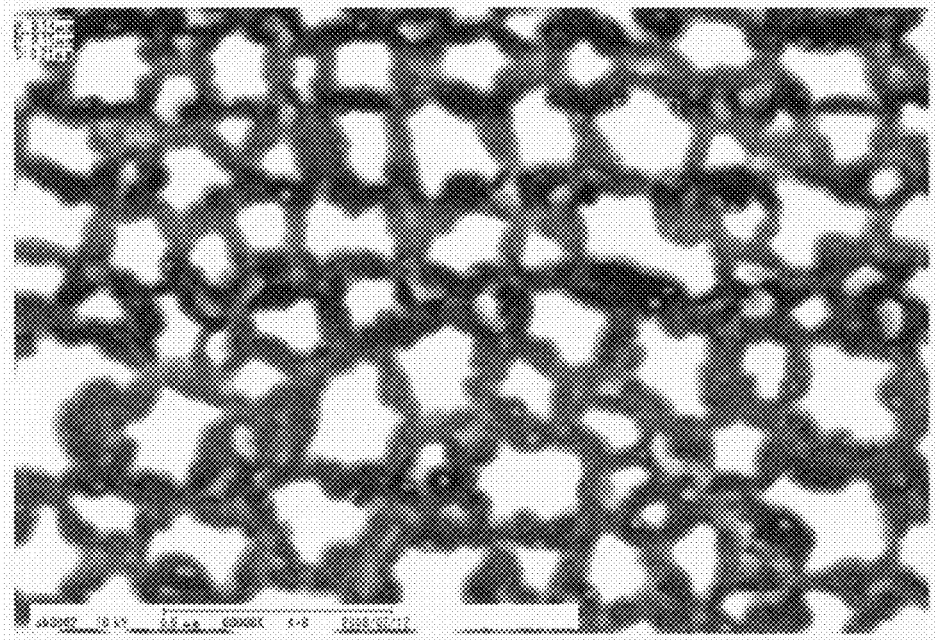
(A)
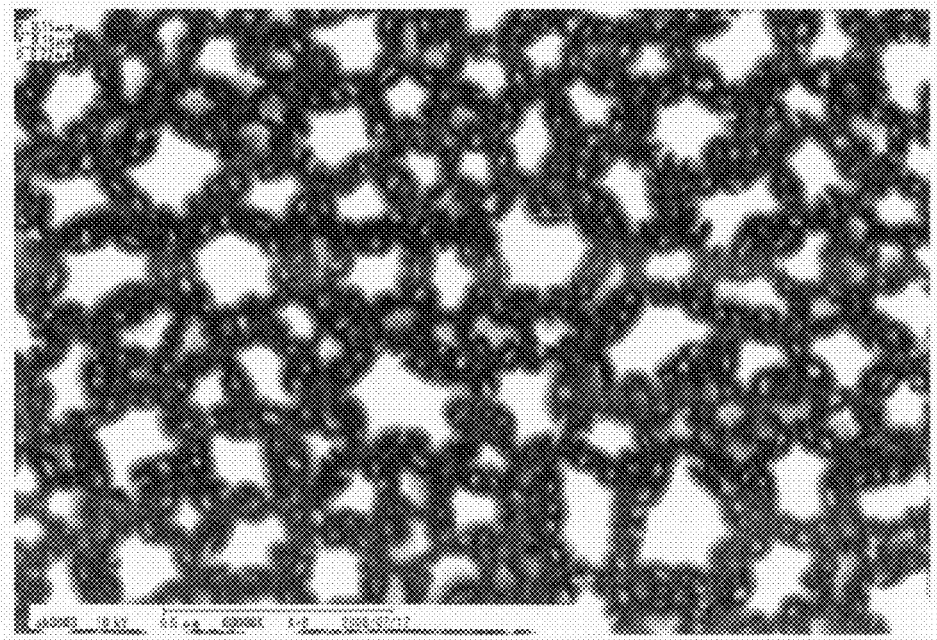
(B)

FIG. 4
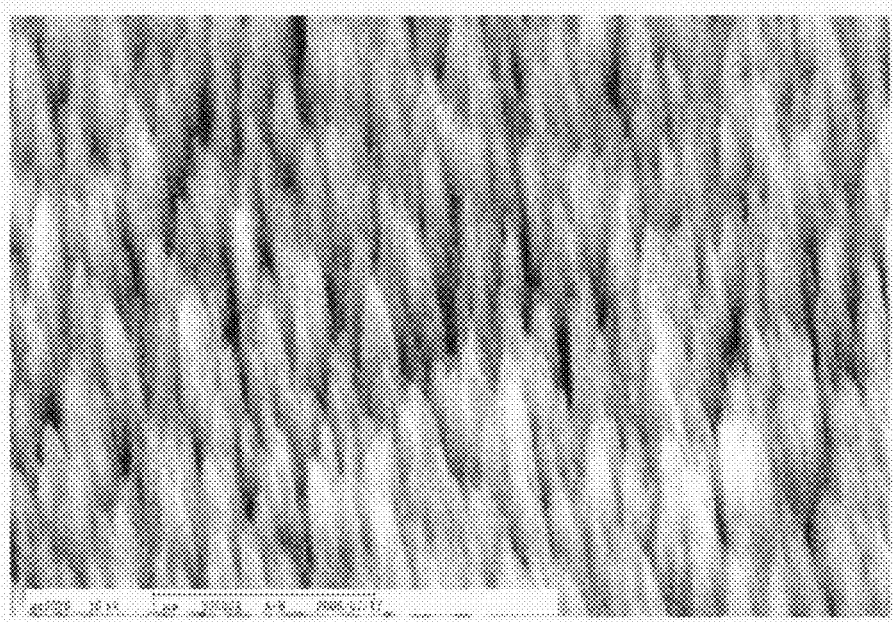
(A)
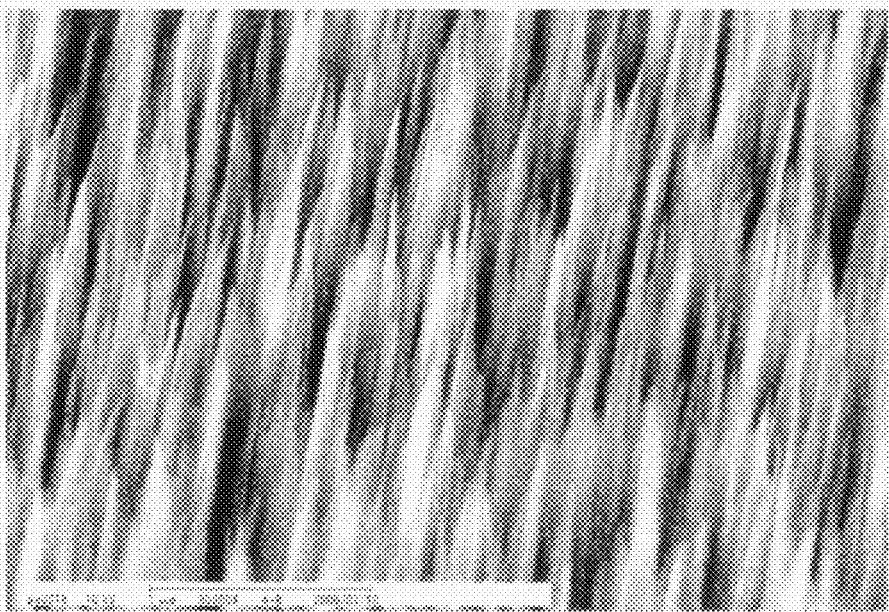
(B)

FIG. 5
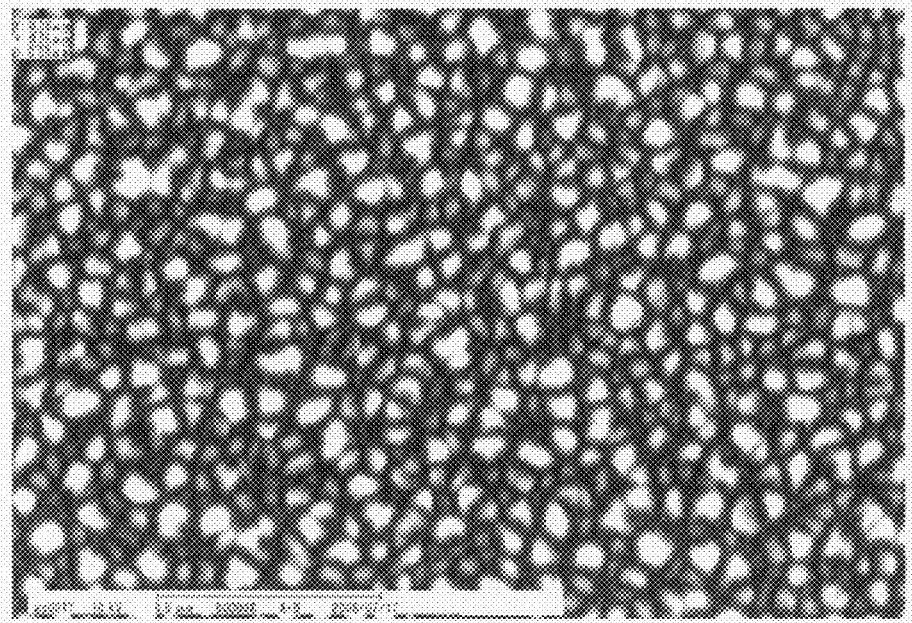
(A)
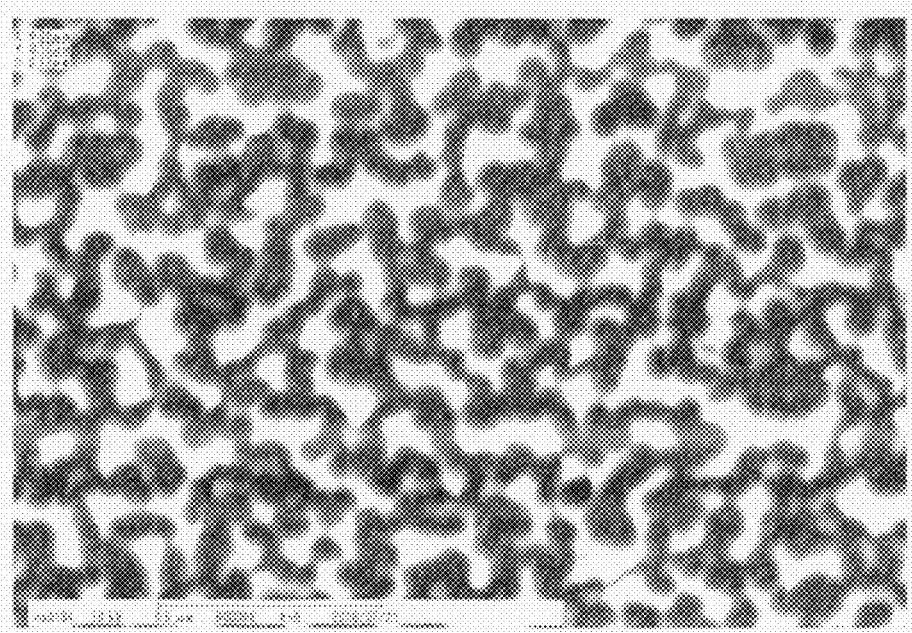
(B)

FIG. 6
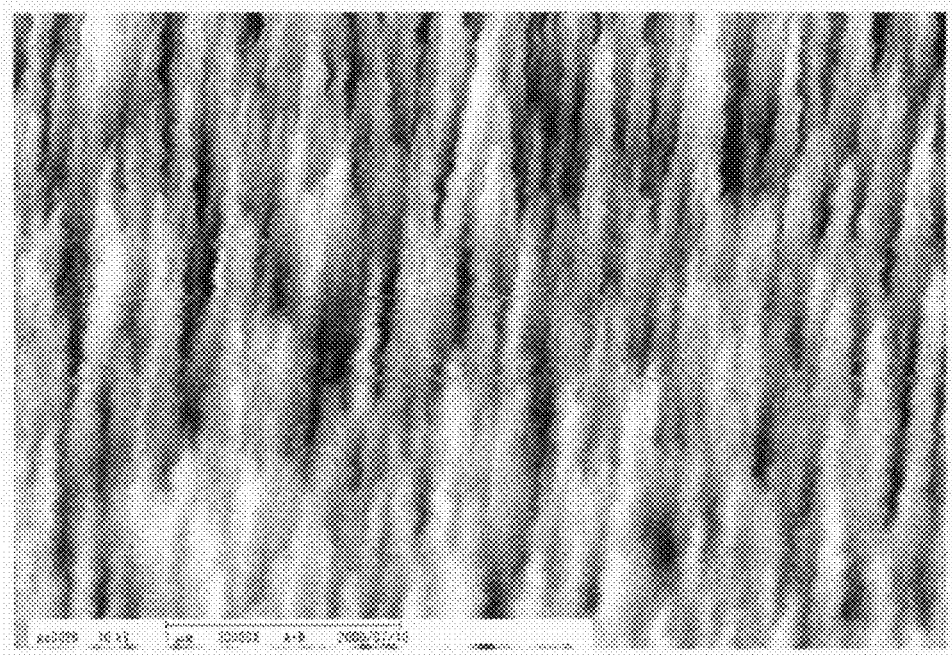
(A)
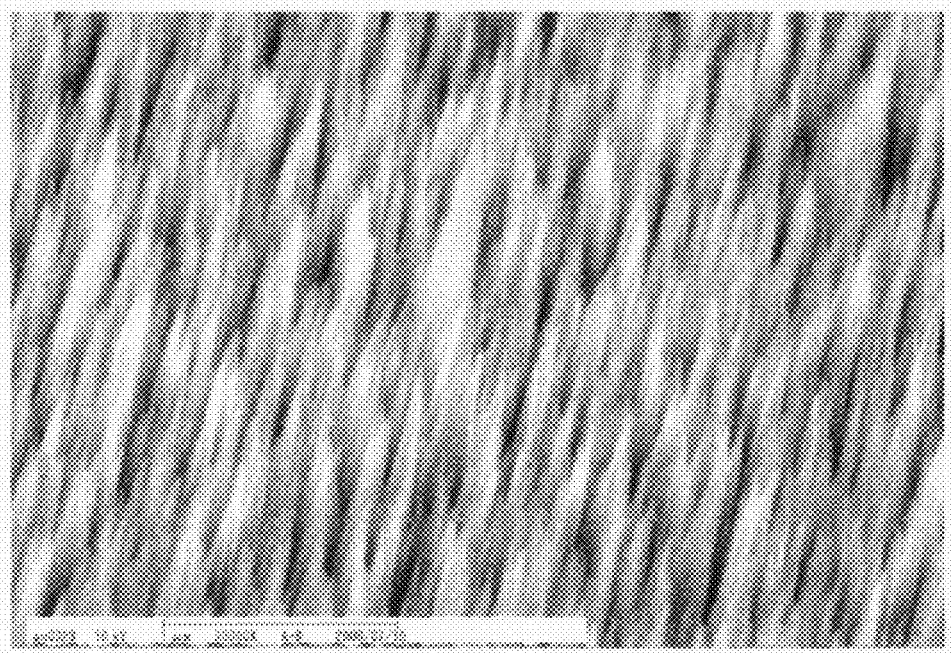
(B)

FIG. 7
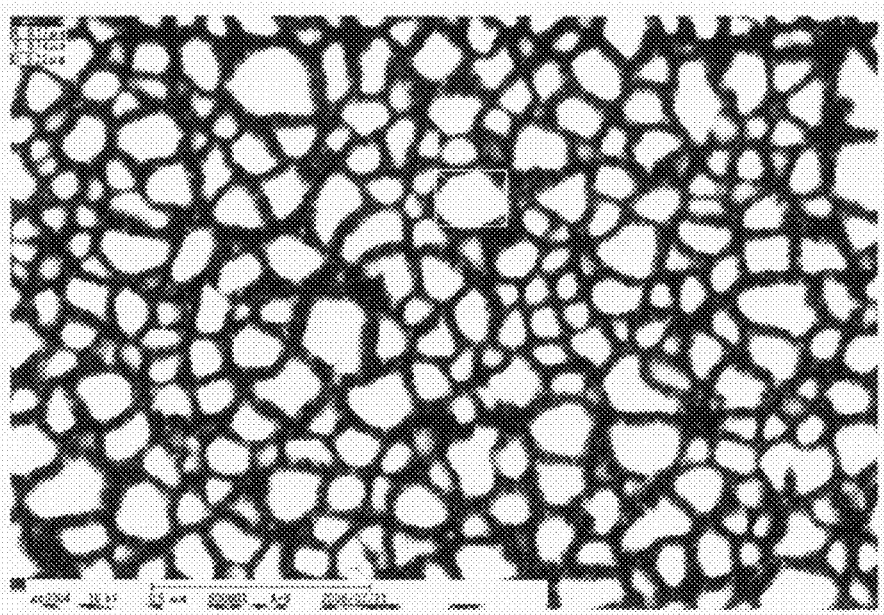
(A)
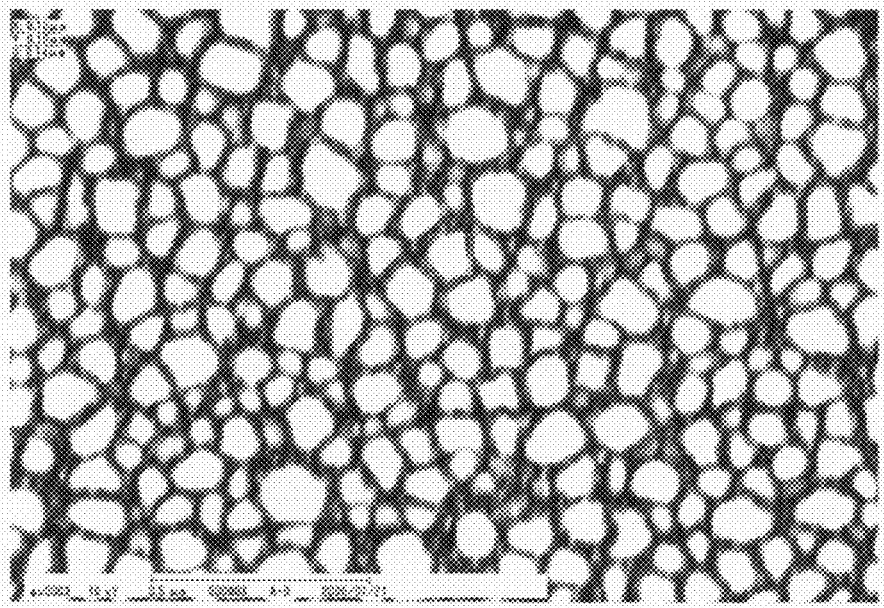
(B)

FIG. 8
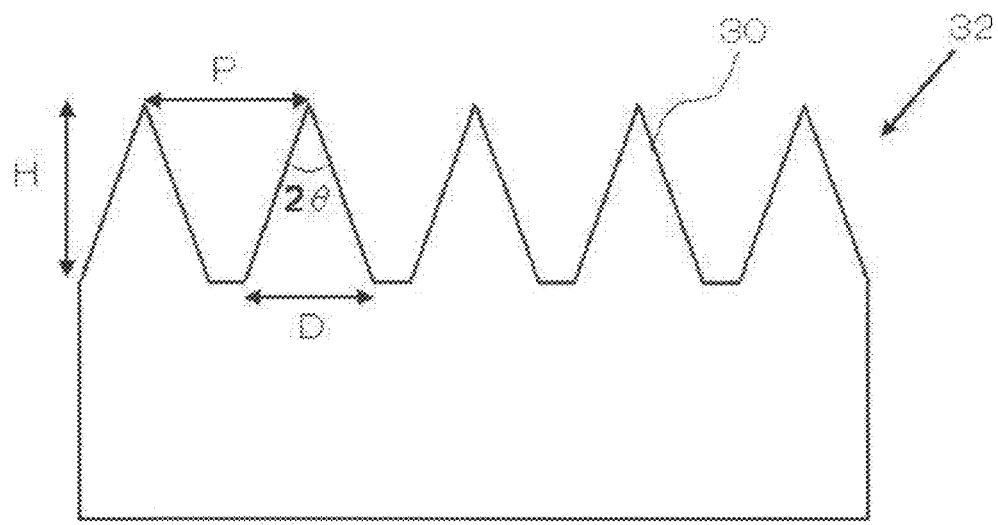
(A)
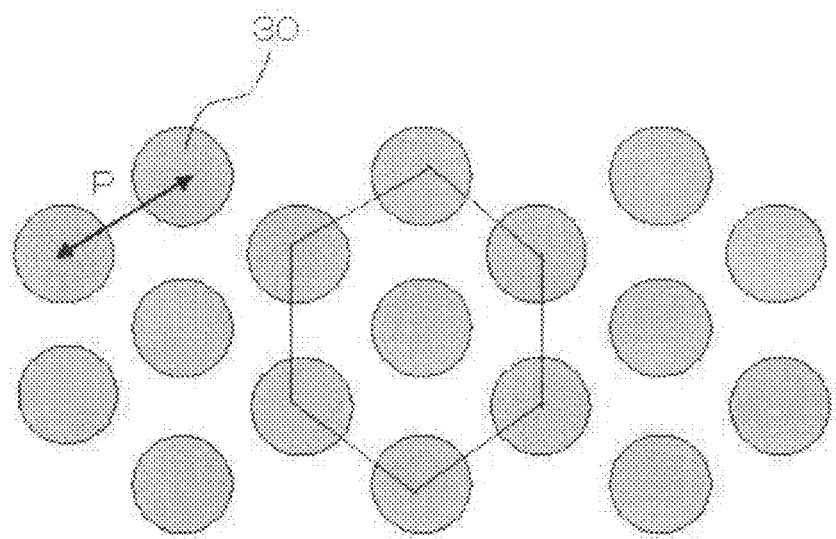
(B)

× 60,000

ECR PROCESSING OF GC FOR 30 MINUTES AT 1000V (A)     (B)

ECR PROCESSING WITH A MIXED GAS OF Ar AND O2

(A)　　　　　　　　　(B)

ANTI-REFLECTION STRUCTURE BODY, METHOD OF PRODUCING THE SAME AND METHOD OF PRODUCING OPTICAL MEMBER

TECHNICAL FIELD

The present invention relates to an anti-reflection structure body capable of transferring an anti-reflection structure even to mainly a substrate or the like having a high melting point such as quartz glass and a method producing the same.

BACKGROUND ART

A transparent substrate made of glass or polymer resin is used as a display of, for example, a personal computer, a slim television, a portable terminal or the like. When light is reflected at a surface of a display, a display content is difficult to be optically recognized, and therefore, it is desired for glass or a resin film constituting the surface of the display to improve contrast by preventing reflection from external light or stray light as less as possible. Further, it is also desired for other optical members such as a glass lens to prevent reflection at a surface thereof.

In order to prevent surface reflection of a display, a lens or the like, a method of carrying out coatings several times by vacuum deposition to reduce reflectance by differences in refractive indices thereof is generally adopted. However, according to this method, it is necessary to carry out the coatings several times for individual members, and therefore, not only is the method troublesome, but a problem of exfoliation of the coating is posed.

As another method of preventing reflection, a method of forming a minute structure at a surface of a substrate is known. Although as a method of forming such a minute structure, for example, there is known a method of patterning a surface of a substrate of quartz glass or the like by photolithography, an electron beam or the like, this procedure is complicated and it is difficult to form a minute structure at a surface having a large area.

Further, for example, a method of forming a minute acicular structure at a surface of a substrate by adhering small particles of Al or the like on an optical member of a quartz glass substrate or the like, and performing dry etching with a mask formed by the particles has been proposed (refer to Japanese Patent Application Laid-Open (JP-A) No. 2005-99707). However, according to this method, for respective substrates, a material that forms the mask is adhered as small particles by sputtering, thereafter, dry etching is carried out, and therefore, not only is productivity invariably low, but it is difficult to form an anti-reflection structure at a substrate having a large area.

As a method of forming an anti-reflection structure at a surface of an optical member having a large area, a method of forming an anti-reflection structure by producing a mold having a minute structure formed at a surface thereof and transferring the minute structure of the mold to an optical member is proposed. For example, a mold is produced by forming nuclei of Cr or the like in an island-like shape on a substrate such as a silicon wafer by vacuum deposition, thereafter, growing acicular crystals of silicon or the like on the nuclei by a CVD method or the like. Further, a method of forming an anti-reflection structure on an optical member of resin or glass by using the mold is proposed (refer to JP-A 2006-130841).

However, according to the above-described method, when the mold is produced, at least formation of the nuclei and growth of acicular crystals are needed, and therefore, the process becomes complicated. Further, although the produced mold can repeat molding for a member made of a resin, the mold cannot repeatedly be used for a member having a high melting point such as quartz glass or the like.

On the other hand, a method of forming a minute structure formed with columnar-shaped projections at a surface of a glassy carbon base member by ICP plasma and forming an anti-reflection structure onto another member by using it as a mold is proposed (refer to JP-A No. 2004-137105).

According to such a method, the minute structure can comparatively simply be formed, further, glassy carbon constituting the mold has a very high melting point, a mechanical strength thereof is comparatively high, and therefore, the minute structure can be transferred onto an objective member such as quartz glass or the like.

However, according to the above-described minute structure composed of the columnar projections, an anti-reflection effect is not sufficient and a minute structure having a higher anti-reflection effect is preferable.

DISCLOSURE OF THE INVENTION

Problems to be Solved by the Invention

It is a main object of the invention to provide an anti-reflection structure body which is easily produced, capable of achieving an anti-reflection effect near to non-reflection, and capable of providing an anti-reflection structure even to a member having a high melting point such as quartz glass or the like by transfer and a method of producing the same as well as a method of producing an optical member using the same.

SUMMARY OF THE INVENTION

In order to achieve the above-described object, according to the invention, the following anti-reflection structure or the like is provided.

<1> An anti-reflection structure body comprising a base member which is made of glassy carbon, at a surface of which is formed an anti-reflection structure comprising a cluster of minute projections each having a shape with a diameter that contracts toward a tip thereof.

<2> The anti-reflection structure body according to <1>, wherein each of the minute projections has a shape with a diameter that contracts from a root thereof towards a tip.

<3> The anti-reflection structure body according to <1> or <2>, wherein an average height of the minute projections falls in a range of from 200 nm to 3000 nm.

<4> The anti-reflection structure body according to any one of <1> through <3>, wherein an average pitch of the minute projections falls in a range of from 50 nm to 300 nm.

<5> The anti-reflection structure body according to any one of <1> through <4>, wherein an average maximum diameter of the minute projections falls in a range of from 50 nm to 300 nm.

<6> The anti-reflection structure body according to any one of <1> through <5>, wherein an angle of a tip portion of each of the minute projections is smaller than 37.8°.

<7> The anti-reflection structure body according to any one of <1> through <6>, wherein large projections, each having a width and a height 5 times greater or more than a width and a height of the minute projections forming the anti-reflection structure, and having a shape with a diameter that contracts towards a tip thereof, are interspersed at the surface of the base member.

<8> A method of producing the anti-reflection structure body according to any one of <1> through <7>, wherein a base member made of glassy carbon is used, the base member is mounted to an ion beam processing apparatus of an ECR type, the base member is subjected to an ion beam processing by using a gas including oxygen, and thereby, the anti-reflection structure comprising a cluster of minute projections is formed at a surface of the base member.

<9> The method of producing the anti-reflection structure body according to <8>, wherein a face of the base member made of the glassy carbon subjected to the ion beam processing is polished.

<10> The method of producing the anti-reflection structure body according to <8> or <9>, wherein a shape and a pitch of the minute projections formed at the surface of the base member are controlled by controlling at least any one of an acceleration voltage, processing time, and a gas flow rate when the base member made of the glassy carbon is subjected to the ion beam processing.

<11> The method of producing the anti-reflection structure body according to <10>, wherein the acceleration voltage is set to be 300 V or higher and the processing time is set to be 18 minutes or longer.

<12> The method according to any one of <8> through <11> of producing the anti-reflection structure body according to <7>, wherein the ion beam processing is carried out after interspersing a mask material for forming the large projections on the surface of the base member made of the glassy carbon.

<13> A method of producing an optical member having an anti-reflection structure at a surface thereof, comprising: using the anti-reflection structure body according to any one of <1> through <7> and transferring the anti-reflection structure formed at the surface of the anti-reflection structure body onto a surface of the optical member.

<14> A method of producing an optical member having an anti-reflection structure at a surface thereof comprising: producing a mold having an anti-reflection structure transferred from an anti-reflection structure body by subjecting the anti-reflection structure body according to any one of <1> through <7> to plating or by forming a metal vapor deposition film thereon, and transferring the anti-reflection structure onto a surface of the optical member by using the mold.

EFFECT OF INVENTION

According to the invention, an anti-reflection structure body which is easily produced, capable of achieving an anti-reflection effect near to non-reflection, and capable of providing the minute structure even to a member having a high melting point such as quartz glass or the like by transfer and a method of producing the same as well as a method of producing an optical member using the same can be provided.

BRIEF DESCRIPTION OF THE DRAWINGS

FIG. 2 shows SEM images (magnification: 30,000 times) taken from diagonally above a surface of the anti-reflection structure body according to the invention produced by changing an acceleration voltage. (A) indicates an acceleration voltage of 1000 V, and (B) indicates an acceleration voltage of 750 V.

FIG. 3 shows SEM images (magnification: 60,000 times) taken from right above the surface of the anti-reflection structure body of FIG. 2. (A) indicates an acceleration voltage of 1000 V, and (B) indicates an acceleration voltage of 750 V.

FIG. 4 shows SEM images (magnification: 30,000 times) taken from diagonally above the surface of the anti-reflection structure body according to the invention produced by changing processing time. (A) indicates a processing time of 30 minutes, and (B) indicates a processing time of 45 minutes.

FIG. 5 shows SEM images (magnification: 60,000 times) taken from right above the surface of the anti-reflection structure body of FIG. 4. (A) indicates a processing time of 30 minutes, and (B) indicates a processing time of 45 minutes.

FIG. 6 shows SEM images (magnification: 30,000 times) taken from diagonally above the surface of the anti-reflection structure body according to the invention produced by changing a gas flow rate. (A) indicates a gas flow rate of 1.4 SCCM, and (B) indicates a gas flow rate of 3.0 SCCM.

FIG. 7 shows SEM images (magnification: 60,000 times) taken from right above the surface of the anti-reflection structure body of FIG. 6. (A) indicates a gas flow rate of 1.4 SCCM, and (B) indicates a gas flow rate of 3.0 SCCM.

FIG. 8 is a model view of the anti-reflection structure body according to the invention. (A) is a sectional view, and (B) is a plane view.

BEST MODE FOR CARRYING OUT THE INVENTION

An explanation will be given of an anti-reflection structure body and a method of producing the same according to the invention in reference to the attached drawings as follows.

When the inventor has carried out intensive investigations and researches on an anti-reflection structure body, the inventor can form a cluster of small projections each having a shape with a diameter that contracts toward a tip thereof at a surface of a glassy carbon base member by using the base member of glassy carbon and processing the base member under a predetermined condition, and has found that a minute structure composed of the cluster of the projections achieves an extremely anti-reflection effect near to non-reflection and has finished the invention by carrying out the researches further.

Figure 1:
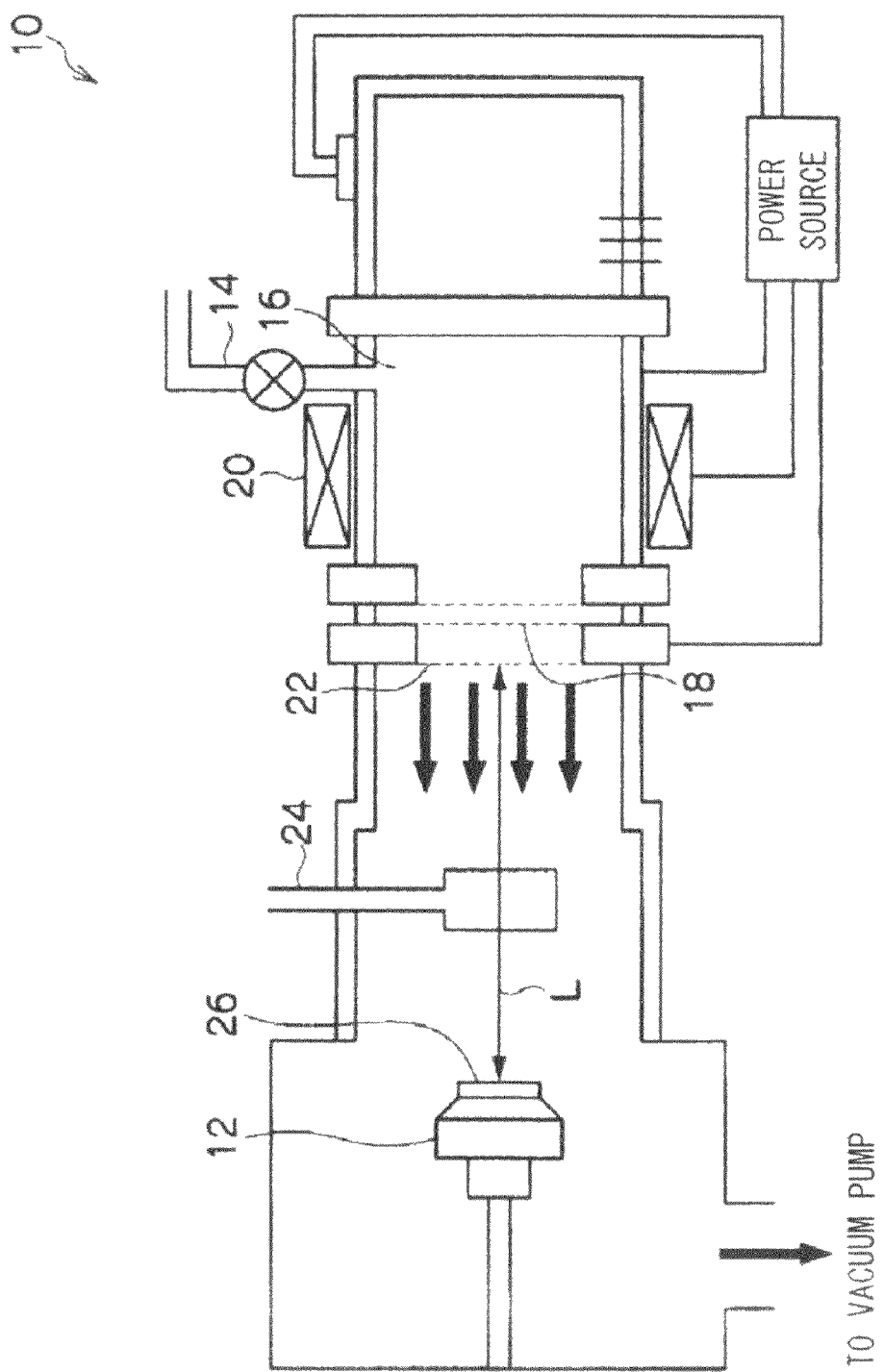
FIG. 1 is a schematic structural view showing an ion beam processing apparatus of ECR type preferable for producing an anti-reflection structure body according to the invention.

FIG. 1 schematically shows an example of a structure of an ion beam processing apparatus (plasma etching apparatus) 10 of an ECR (Electron Cyclotron Resonance) type capable of being used for producing an anti-reflection structure body according to the invention. The ion beam processing apparatus 10 includes a holder 12 for holding a base member 26 constituting a raw material as well as a gas introducing pipe 14, a plasma generating chamber 16, an extractor 18, an electromagnet 20, an ion beam extracting electrode 22, a Faraday cup 24 and the like for subjecting an ion beam processing to a surface of the base member 26 as a raw material. Further, for example, at a low acceleration voltage equal to or lower than 500 V, a current density becomes small, and therefore, the extractor 18 is a grid for extracting an ion on a plasma side of the extracting electrode 22 in order to increase the current density. When the extractor 18 is used, even when the acceleration voltage is low, the current density becomes large and a processing rate can be increased.

When the anti-reflection structure body according to the invention is produced by using such an ion beam processing apparatus 10 of ECR type, first, the base member made of glass-like carbon (glassy carbon) constituting the raw material is prepared, and the base member is set to the holder 12. The glass-like carbon base member used may have a plate-like shape, of course, but a face thereof subjected to the ion beam processing may be a curved face. Further, it is preferable that the face subjected to the ion beam processing is polished. In the case of the polished face, the face is a smooth face before being etched and small projections are easy to be formed uniformly by processing.

After mounting the glassy carbon base member inside the apparatus 10, the surface of the base member 26 is subjected to ion beam processing by introducing a reaction gas and applying a predetermined acceleration voltage.

As a reaction gas, a gas including oxygen is used, only oxygen may be used, or also a mixed gas of oxygen and CF gas such as $CF_4$ can be used.

After subjecting the surface of the glassy carbon base member 26 to the ion beam processing, a cluster of small projections (minute structure) each having a shape with a diameter that contracts toward a tip thereof such as an acicular shape or the like can be formed. Further, particularly, a shape (size, width, angle or the like) and a pitch of the projection can be controlled by controlling an acceleration voltage, processing time, and gas flow rate.

Further, when the ion beam processing apparatus 10 of the ECR type is used, even a comparatively large face can be processed at once. Further, according to such a method, the glassy carbon base member can be easily subjected to surface processing and the anti-reflection structure body capable of achieving an anti-reflection effect near to non-reflection can be produced.

<Control by Acceleration Voltage>

FIG. 2 shows SEM images (magnification: 30,000 times) taken from diagonally above (at an angle of around 75°) a surface of an anti-reflection structure produced by processing a surface of a glass-like carbon (glassy carbon) base member by changing an acceleration voltage using the above-described apparatus 10. (A) indicates a case in which the base member is processed by setting an acceleration voltage to 1000 V, and (B) indicates a case in which the base member is processed by setting the acceleration voltage to 750 V. In each case, processing time is 60 minutes, and the gas flow rate is 2.0 SCCM. In each case, a number of projections of acicular shape are formed; in case (B) in which the base member is processed by setting the acceleration voltage to 750 V, the projections are larger than those shown in case (A) in which the acceleration voltage is 1000 V.

FIG. 3 shows SEM images (magnification: 60,000 times) taken from right above surfaces of the respective anti-reflection structures of FIG. 2, and a white portion corresponds to the projection. In each case, the projections are formed substantially uniformly over entire faces thereof.

<Control by Processing Time>

FIG. 4 shows SEM images (magnification: 30,000 times) taken from diagonally above surfaces of anti-reflection structures produced by setting the acceleration voltage to 500 V and setting the gas flow rate to 2.0 SCCM, (A) indicates a case in which the processing time is set to 30 minutes, and (B) indicates a case in which the processing time is set to 45 minutes. In case (A) in which the processing time is 30 minutes, a number of projections of needle or circular cone shape which are comparatively small and thick are formed. On the other hand, in case (B) in which the processing time is 45 minutes, a number of projections of considerably thin needle shape are formed.

FIG. 5 shows SEM images (magnification: 60,000 times) taken from right above surfaces of the respective anti-reflection structures of FIG. 4, in case (B) in which the processing time is set to 45 minutes, white portions showing the projection portions are more formed.

<Control by Gas Flow Rate>

FIG. 6 shows SEM images (magnification: 30,000 times) taken from diagonally above a surface of an anti-reflection structure produced by setting the acceleration voltage to 500 V and setting the processing time to 60 minutes, (A) indicates a case in which the gas flow rate is set to 1.4 SCCM, (B)

indicates a case in which the gas flow rate is set to 3.0 SCCM. In case (A) in which the gas flow rate is 1.4 SCCM, projections of needle a surface of which is provided with slight recesses and projections are formed.

FIG. 7 shows SEM images (magnification: 60,000 times) taken from right above surfaces of the respective anti-reflection structures of FIG. 6, in case (B) in which the gas flow rate is set to 3.0 SCCM, white portions indicating projection portions are more formed.

In this way, the shape and the pitch of the projections formed at the surface of the glassy carbon base member by using the ion beam processing apparatus 10 of the ECR type shown in FIG. 1 are significantly influenced by the acceleration voltage, the processing time, and the gas flow rate in the ion beam processing. Therefore, the shape and the pitch of the projection formed at the surface of the base member can be controlled by controlling at least one of the acceleration voltage, the processing time, and the gas flow rate. Further, by adjusting the acceleration voltage, the processing time, the gas flow rate and the like, with regard to the shape of the projection having a diameter that contracts towards a tip thereof, a cluster of minute projections can be formed not only in an acicular shape but also a circular cone shape, a polygonal cone shape, a truncated circular cone shape, a truncated polygonal cone shape, or a parabolic shape, or the like.

According to the research of the inventor, particularly, by subjecting the GC substrate to the ECR processing by making the acceleration voltage equal to or higher than 300 V, further, making the processing time equal to or longer than 18 minutes, projections of acicular shape or circular cone shape with a diameter that contracts from a root portion to a tip portion can firmly be formed, and the reflectance can be made to be equal to or smaller than 20%. Further, when the acceleration voltage is made to be excessively large, the projections become thin and are liable to be broken in transfer, when the processing time is prolonged, there is a concern of bringing about a reduction in a productivity, and therefore, it is preferable that the acceleration voltage is made to be equal to or lower than 1000 V, the processing time is made to be equal to or shorter than 30 minutes.

Further, in the case of the surface of the glassy carbon base member which is provided with the cluster of minute projections each having a shape with the diameter that contracts toward the tip as described above, in comparison with the case of forming the columnar-shaped projections, it is thought that incident light is difficult to be reflected, and thus higher anti-reflection effect is achieved.

Figure 9:
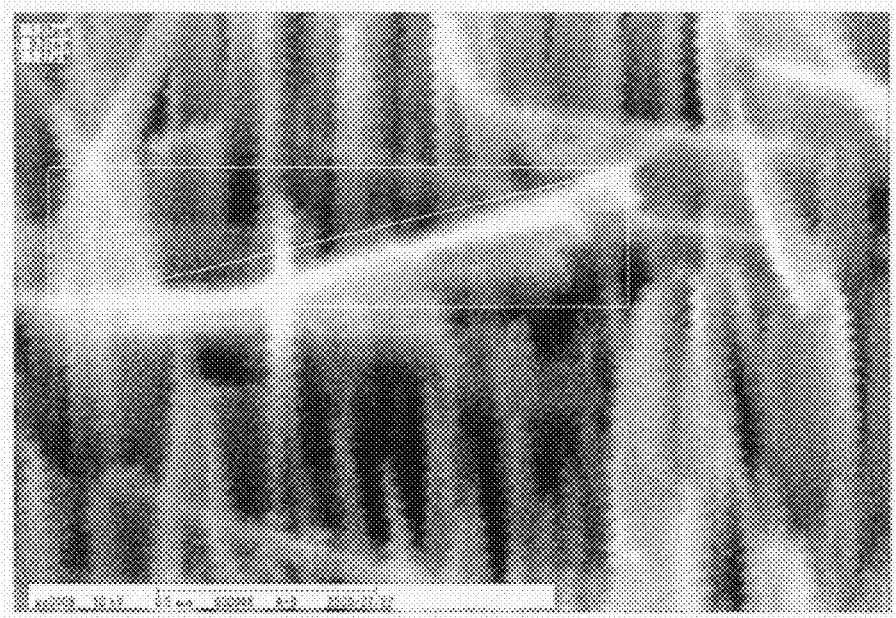
FIG. 9 shows an SEM image showing a state of projections collapsed when a length of an acicular projection of the anti-reflection structure body is measured.
Figure 10:
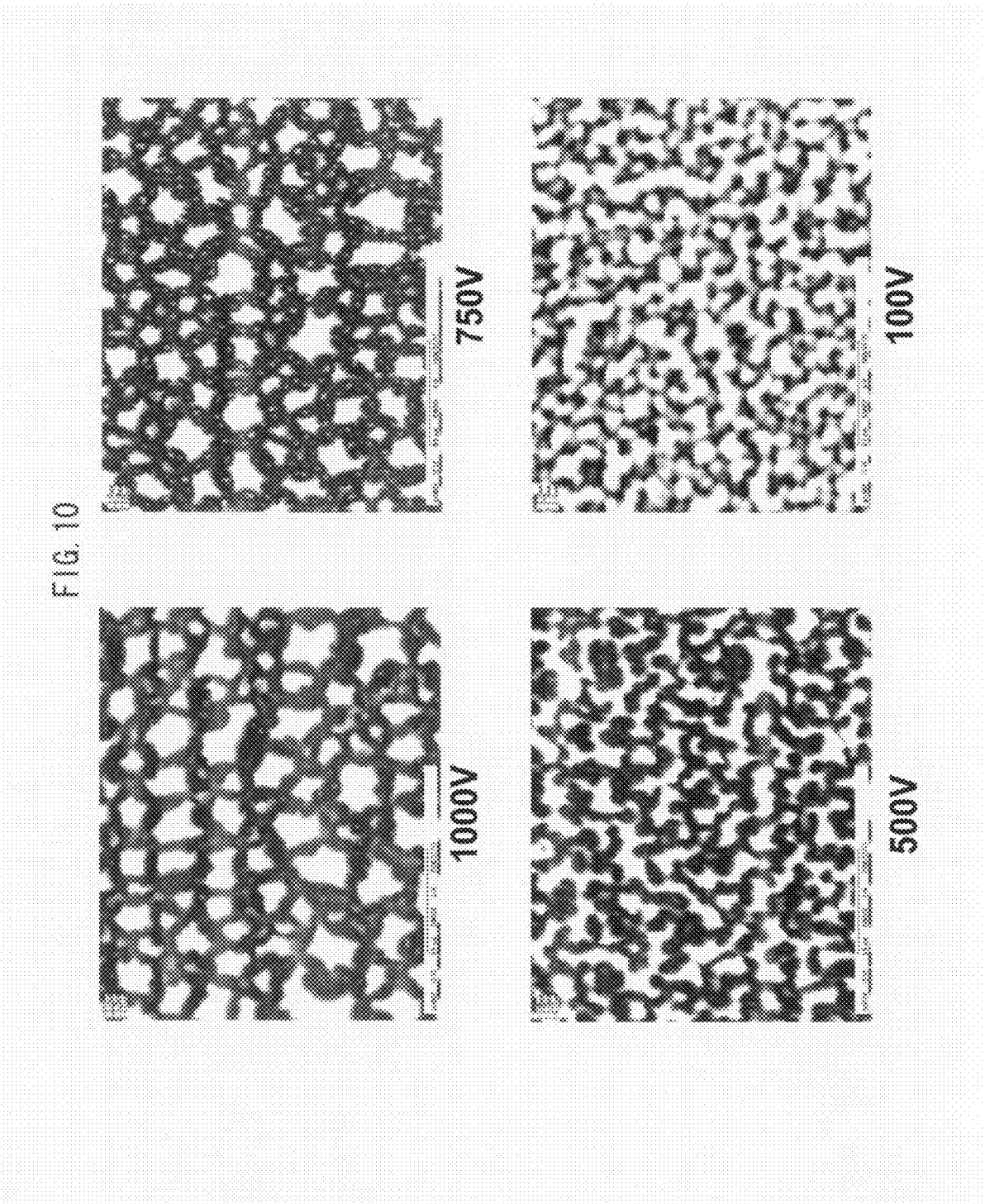
FIG. 10 shows SEM images used in measuring a width and a pitch of the acicular projection of the anti-reflection structure body.

FIG. 8 shows model views showing an anti-reflection structure according to the invention. FIG. 9 shows an example of an SEM image of collapsed projections of acicular shape for measuring a size of a projection 30 constituting the anti-reflection structure. Further, FIG. 10 shows SEM images taken for measuring a pitch of the projection 30 of the anti-reflection structure. When the inventor has repeated the measurement by such SEM images, it is found that an extremely high anti-reflection effect is achieved when the minute projections 30, which are formed at the surface of the anti-reflection structure 32 according to the invention and each of which has a shape with the diameter that contracts toward a tip, have an average height (H) of from 200 nm to 3000 nm, further preferably from 720 nm to 1370 nm, and a diameter of root of the respective projections 30, that is, an average maximum diameter (D) falls in a range of from 50 nm to 300 nm, further preferably from 80 nm to 220 nm, and the minute projections 30 are formed by a pitch (P) of from 50 nm to 300 nm, further preferably from 120 nm to 220 nm. Particularly, when the height of the projection is equal to or higher than 200 nm and the projection is formed by a pitch equal to or smaller than 140 nm, a non-reflection structure can be formed.

Further, the inventor has carried out an investigation with regard to a relationship between an angle of the projection tip portion and the reflectance. When the projection 30 with a diameter that contracts from the root portion to the tip portion in a tapering shape as shown in FIG. 8 is formed by a predetermined pitch, $\theta=\tan^{-1}(r/h)$ is established from $\tan\theta=r/h$ when angle (apex angle) of the tip portion of the projection 30 is designated by notation $2\theta$, a radius (D/2) of the root portion is designated by notation r, and the height is designated by notation h.

Further, the condition constituting the non-reflection structure requires the pitch (P)<137 nm and the height (h)>200 nm, theoretically. Thereby, the non-reflection structure is constituted in a case of $2\theta<37.8°$. Therefore, when the angle of the tip portion of the projection 30 satisfies the above-described relationship, it is thought that non-reflection or a reflectance near thereto can be achieved. However, when the angle of the projection tip portion is excessively small, it is thought that projection is liable to be broken in transfer, further, the reflectance is increased by making a diameter near to that of columnar shape having a uniform diameter. Therefore, when the projection 30 has a needle shape or a circular cone shape, the angle of the tip portion is preferably equal to or larger than 3°, further preferably equal to or larger than 10°, particularly preferably equal to or larger than 15°.

The anti-reflection structure body of the invention having a cluster of the minute projections having the shape with the diameter that contracts toward the tip such as the acicular shape or the like at the surface of the glassy carbon base member is provided with an anti-reflection function near to non-reflection and can be used as an anti-reflection substrate ort the like.

On the other hand, the whole of the anti-reflection structure body according to the invention is made of glassy carbon, different from carbon material such as graphite, a mechanical strength thereof is high, and therefore, the anti-reflection structure body can also be used as a mold for forming the anti-reflection structure at another member. That is, the minute structure composed of the projections in the acicular shape or the like which are formed in the anti-reflection structure body of the invention can repeatedly be transferred not only to a resin material but to a member having a high melting point such as quartz glass or a metal. Further, the anti-reflection structure according to the invention is formed of the minute projections of acicular shape or the like, the structure achieves an extremely high anti-reflection effect, and therefore, the anti-reflection effect can also be reflected to quartz glass or the like. Therefore, when the anti-reflection structure body according to the invention is used, a quartz glass substrate or the like having the anti-reflection function near to non-reflection can be produced with a high productivity.

Further, a mold may be produced by subjecting the anti-reflection structure body according to the invention to plating or vapor deposition with a metal of nickel, gold or the like. The anti-reflection structure of the anti-reflection structure body according to the invention is reflected in the mold produced in this way. Therefore, when the mold is used, the anti-reflection structure of the anti-reflection structure body according to the invention can be indirectly reflected in a member having a comparatively low melting point (softening temperature) such as a film or the like composed of, for example, a resin material, and a resin film or the like having an anti-reflection function near to non-reflection can be produced.

Further, the anti-reflection structure body according to the invention may be interspersed with large projections each of which has a width and a height 5 times greater or more than those of the minute projections constituting an anti-reflection structure and has a shape with a diameter that contracts toward a tip at a surface of a glassy carbon base member. In order to form such a large projection, for example, ion beam processing may be performed in a state of interspersing a mask material for forming the large projection on the surface of the glassy carbon base member. As a result, the other portions than the mask portions are processed and the masked portions remain as the large projections. Further, as the mask material, for example, siloxane polymer or the like can be used, and the masks can be interspersed at predetermined positions on the glassy carbon base member by photolithography, electron beam lithography or the like.

Figure 12:
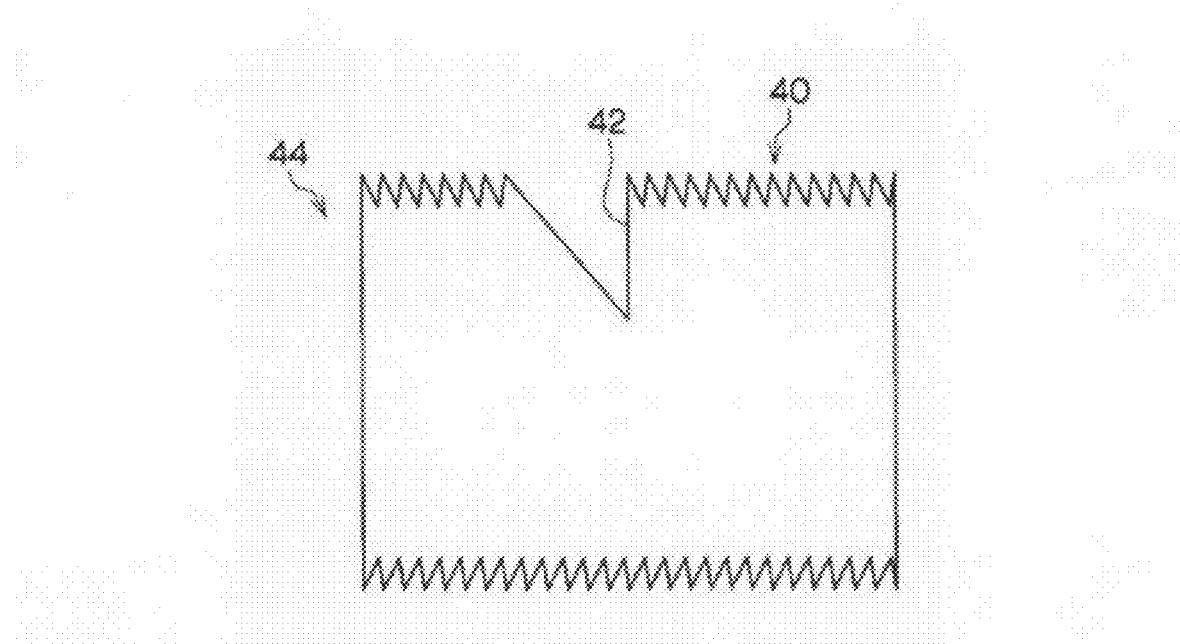
FIG. 12 is a schematic view showing an example of an optical member which can be produced when the anti-reflection structure body according to the invention is used as a mold.

Further, when the anti-reflection structure interspersed with the large projections along with the minute projections in the acicular shape or the like at the surface of the glassy carbon base member in this way is used as a mold, and the structure is transferred onto, for example, an optical member of quartz glass or the like, the optical substrate can be processed to a surface structure having a cluster of minute projections 40 of nano order and notched portions 42 (referred to as micro prism array or the like) of a micro order as shown in FIG. 12. When glass 44 having such a surface structure is made, the optical member 44 having a higher anti-reflection effect can be provided.

EXAMPLES

Although a specific explanation will be given of the invention by examples as follows, the invention is not limited to the examples.

Example 1

A substrate (thickness: 1 mm, length and width: 10 mm×10 mm) of glassy carbon (made by Tokai Carbon Corp.) a surface of which is polished is set to a holder of an ion beam processing apparatus (made by Elionix INC., trade name: EIS-200ER) of an ECR type having a constitution as shown in FIG. 1. A distance L between a beam extracting electrode and a surface of the plate-like member is 17 cm, and surface processing is carried out under the following condition.

Acceleration voltage: 1000 V
Vacuum degree: $1.3×10^{-2}$ Pa
Beam diameter: 20 mm
Reaction gas: oxygen
Gas flow rate: 2.0 SCCM
Processing time: 10 minutes Examples 2 through 12

The surface processing of the glassy carbon substrate is carried out by changing at least one of the acceleration voltage, the gas flow rate and the processing time from those of Example 1.

Processing conditions of Example 1 through Example 12 are summarized in Table 1.

TABLE 1

| example No. | acceleration voltage [V] | extractor | gas flow rate [SCCM] | processing time [min] | current density [mA/cm$^2$] | processing depth [µm] |
|---|---|---|---|---|---|---|
| 1 | 1000 | 0 | 2.0 | 10 | 2.07 | 2.9 |
| 2 | 1000 | 0 | 2.0 | 60 | 1.95 | 15.8 |
| 3 | 750 | 0 | 2.0 | 10 | 1.80 | 3.1 |
| 4 | 750 | 0 | 2.0 | 60 | 1.80 | 19.5 |
| 5 | 500 | 0 | 2.0 | 5 | 1.20 | 0.73 |
| 6 | 500 | 0 | 2.0 | 10 | 1.23 | 1.6 |
| 7 | 500 | 0 | 2.0 | 30 | 1.20 | 5.1 |
| 8 | 500 | 0 | 2.0 | 45 | 1.20 | 8.6 |
| 9 | 500 | 0 | 1.4 | 60 | 1.29 | 10.5 |
| 10 | 500 | 0 | 3.0 | 60 | 0.96 | 9.7 |
| 11 | 250 | 10 | 2.0 | 60 | 1.14 | — |
| 12 | 100 | 10 | 2.0 | 60 | 1.20 | — |

In Examples 11 and 12, the extractor 18 is used and scale 10 of the extractor 18 corresponds to 300 V. The current density is a measured value at a Faraday cup 24.

"Processing depth" in Table 1 is a depth of a recess portion formed at a surface of the substrate by irradiating an ion beam, and an anti-reflection structure formed of a cluster of projections of acicular shape or the like is formed at a bottom face of the recess portion.

<Measurement of Reflectance>

A reflectance is measured with regard to the surfaces of the substrates processed in Examples 1 through 12. In measuring the reflectance at this occasion, a halogen light source is used, as a spectrograph, Handy Lanbda 2 (made by Spectra Co-op corp.) is used, and the reflectance is measured in a vertical incidence. Further, a reflectance is measured with regard to surfaces (processed faces) of respective glassy carbon substrates by using a silicon mirror face as a reference sample.

Figure 11:
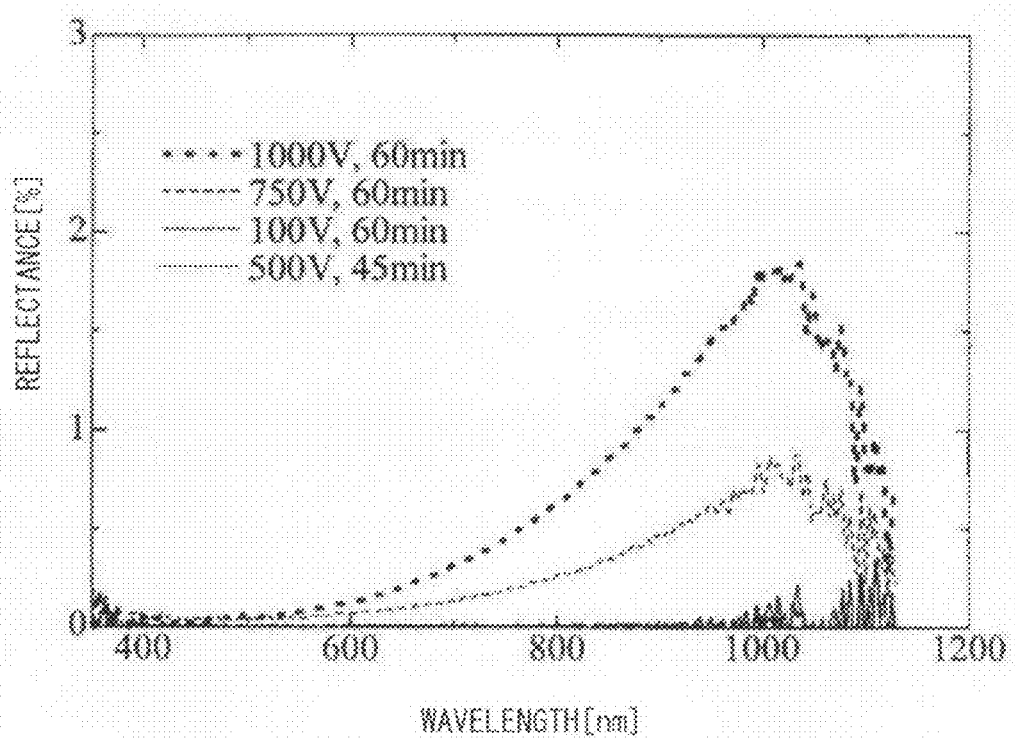
FIG. 11 is a graph showing a result of measuring an anti-reflection effect with regard to the anti-reflection structure body produced by the invention.

FIG. 11 shows a result of measurement with regard to substrates of Examples 2, 4, 8, 12, the ordinate axis designates a relative value (%) when light reflected from the silicon mirror face is regarded as 100. As is shown in FIG. 11, according to the substrates of Example 8 (500 V) and Example 12 (100 V) which are processed by setting the acceleration voltage to be comparatively low, the reflectances are substantially 0% (non-reflection) with regard to visual light (wavelength: 380 nm through 780 nm) and the reflectances are extremely low also in a long wavelength side.

On the other hand, according to the substrates of Example 2 (1000 V) and Example 4 (750 V) which are processed by a comparatively high acceleration voltage, although reflection is slightly observed, the reflectance in Example 4 is equal to or smaller than 1% over an entire wavelength even thereby, the reflectance even in Example 2 is equal to or smaller than 2%, and an extremely high anti-reflection effect is confirmed.

Further, a height, a maximum diameter, and a pitch of the respective minute projections are measured based on SEM images of Examples 1 through 12. The height of the respective projections falls in a range of from 720 nm to 1370 nm, a diameter of a root falls in a range of from 80 nm to 220 nm, the pitch falls in a range of from 120 nm to 220 nm.

Transfer Example 1

An anti-reflection structure is formed by processing one face of a glassy carbon (GC) substrate (length and width: 10×10 mm, thickness: 1 mm) by using ECR under the following condition.
Acceleration voltage: 500 [V]
Processing time: 30 [min]
Extractor: 0
Gas kind: oxygen
Gas flow rate: 3.0 [SCCM]
Ion emission: 13.1 [mA]
Rotation speed of holder: 0 [rpm]
Microwave output: 100 [W]
Current density: 1.67 [mA/cm$^2$]
Distance (L) between beam extracting electrode and GC substrate: 11.7 cm A face at which the anti-reflection structure is formed by the above-described processing is coated by a fluoro-resin coating agent (OPTOOL (registered trade mark), made by Daikin Industries Ltd., 0.1%) as a mold release agent, thereafter, spin-coated with a photo-curable resin (PAK-01, made by Toyo Gosei Co., Ltd.) thereon. The face coated with PAK-01 is pressed to a slide glass, and transfer is carried out by curing PAK-01 by irradiating ultraviolet ray from a side of the slide glass under the following condition.
Press pressure: 0.83 [MPa]
Pressure maintaining time: 60 [s]
UV irradiation amount: 2 [J/cm$^2$]

After having been cured, PAK-01 is released, and a reflectance with regard to the face of the GC substrate at which an anti-reflection structure is transferred is measured using a Si mirror face substrate as a reference.

Further, transfer is carried out again by using as a mold the anti-reflection structure body made of PAK-01 obtained by the transfer. The retransfer is carried out under a condition similar to that of the first transfer by using the fluoro-resin coating agent (OPTOOL (registered trade mark), 0.1%) and PAK-01 used for first transfer.

A reflectance is measured similar to the above-described also with regard to the anti-reflection structure body made of PAK-01 provided by the retransfer.

Figure 13:
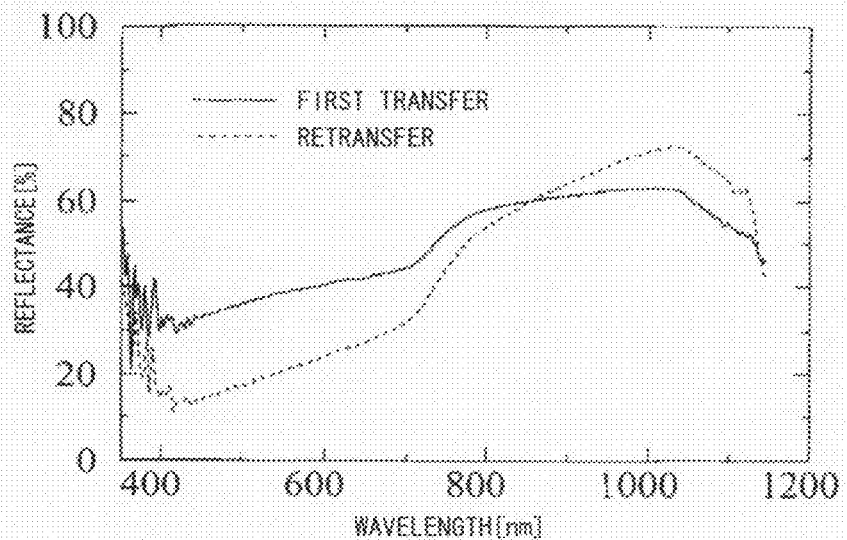
FIG. 13 is a diagram showing reflectances of respective resin substrates obtained by a first transfer and a retransfer.
Figure 14:
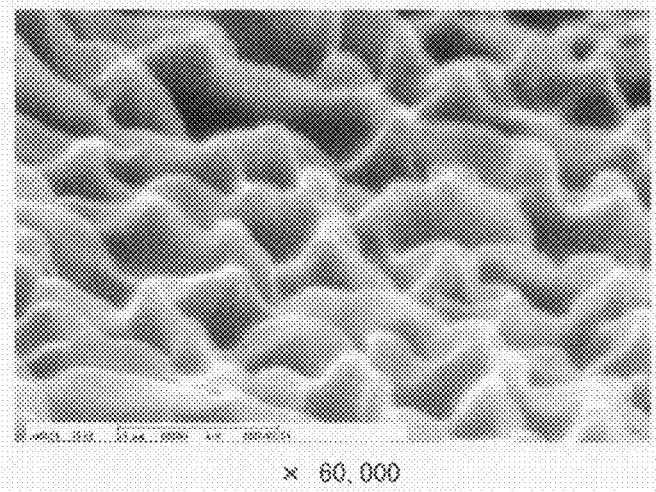
FIG. 14 shows an SEM image (magnification: 60,000 times) of a surface of a retransferred resin substrate.

FIG. 13 shows the reflectance of the resin (PAK-01) substrate obtained by the first transfer and the reflectances of the resin substrate provided by the retransfer. Although both of the reflectances of the resin substrates are generally higher than that of the GC substrate of an original mold, tendencies of the reflectances including peaks at a vicinity of a wavelength 1000 nm are similar to that of the original mold, and it is known that the anti-reflection structure of the original mold is transferred to the PAK-01 resin. Further, it is known that a shape of the reflectance of the PAK-01 resin provided by the retransfer is more similar to that of the original mold than that of the first transfer and is more reflected with the anti-reflection structure of the original mold. Further, when the surface of the retransferred resin substrate is observed by SEM (60,000 times), a number of minute projections in which the anti-reflection structure of the GC substrate is reflected are formed as shown in FIG. 14.

Transfer Example 2

Transfer is carried out by using SOG (Spin on Glass, made by Honeywell International Inc., Accuglass (registered trade mark) 512B). Similar to Transfer Example 1, SOG is spin-coated on a GC substrate in which the anti-reflection structure is formed by ECR, thereafter, the GC substrate is baked for 3 minutes, at 250° C.

Successively, PAK-01 is spin-coated on the baked SOG layer, thereafter, transfer is carried out by pressing a slide glass thereto and curing PAK-01 under the following condition.
Pressure: 1.07 [MPa]
Pressure maintaining time: 60 [s]
UV irradiant dose: 2 [J/cm$^2$]

When the reflectance of SOG in which the anti-reflection structure is transferred as described above is measured, it is known that the reflectance similar to that in the transfer to PAK-01 resin is determined and the anti-reflection structure of the original mold is reflected.

[Measurement of Absolute Reflectance]

A GC substrate (30 mm square) at one surface of which an anti-reflection structure is formed by ECR and a Si mirror face substrate (30 mm square) are prepared and respective absolute reflectances thereof are measured. A measuring condition is as follows.
measuring apparatus: ultraviolet visible spectroscopic photometer (made by Shimadzu Corp., UV-3100PC)
Measuring method: absolute reflection method
Angle of incidence: 5°, 12°, 30°, 45°
Measured wavelength: 300 through 2500 nm
Slit width: 7.5 nm (300 through 860 nm), 20 nm (860 nm through 2500 nm)
Light source: heavy hydrogen lamp (300 through 360 nm), halogen lamp (360 nm through 2500 mm)
Detector: photomultiplier: (300 through 860 nm), PbS (860 nm through 2500 nm)

Figure 15:
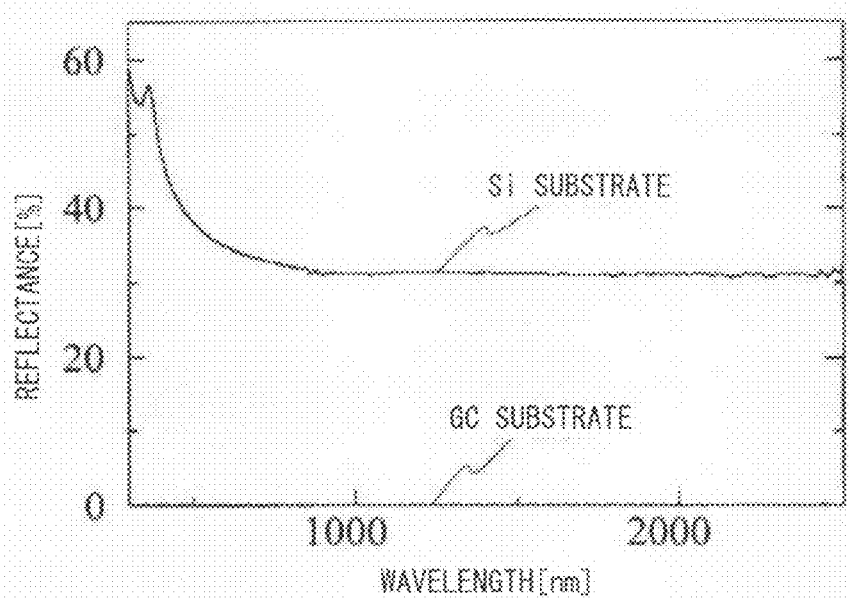
FIG. 15 is a diagram showing respective absolute reflectances (angle of incidence of 5°) of a GC substrate and a Si mirror face substrate.
Figure 16:
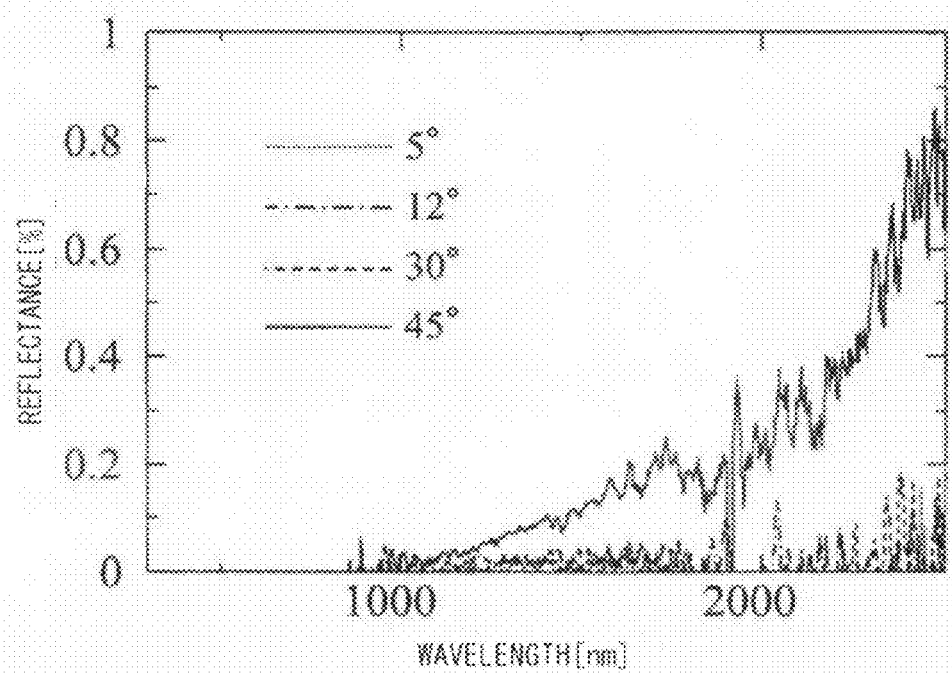
FIG. 16 is a diagram showing a relationship between an angle of incidence (5°, 12°, 30°, 45°) and a reflectance of a GC substrate.

FIG. 15 shows respective absolute reflectances (incidence angle of 5°) of a GC substrate and a Si mirror face substrate. Although in the Si substrate, the reflectance is equal to or larger than 30%, the reflectance of the GC substrate is substantially 0% over a wide wavelength range of 300 nm through 2500 nm. Further, FIG. 16 shows the reflectance of the GC substrate when an angle of incidence of light is changed to 5°, 12°, 30°, or 45°, and the reflectance is less than 1% in any of the angles of incidence. For example, although in an anti-reflection coating of a multilayered film, when the angle of incidence is increased, normally, an effect of restraining a reflection is reduced, when the anti-reflection structure is formed at the surface of the GC substrate by the invention, the reflection can be restrained extremely effectively over a wide angle.

[Dependence on Processing Angle]

In order to investigate a workability of a GC base member a surface of which is constituted by a roll (curved face) shape, processing is carried out by ECR by inclining a flat GC substrate by a predetermined angle. Specifically, processing is carried out by holding the GC substrate (length and width: 10×10 mm, thickness: 1 mm) by a jig capable of changing an angle and inclining an angle (processing angle) between an incidence angle of an ion beam and a perpendicular line of a processed face of the GC substrate by 10° through 80° at intervals of 10° and a reflectance of the GC substrate as processed is measured.

Figure 17:
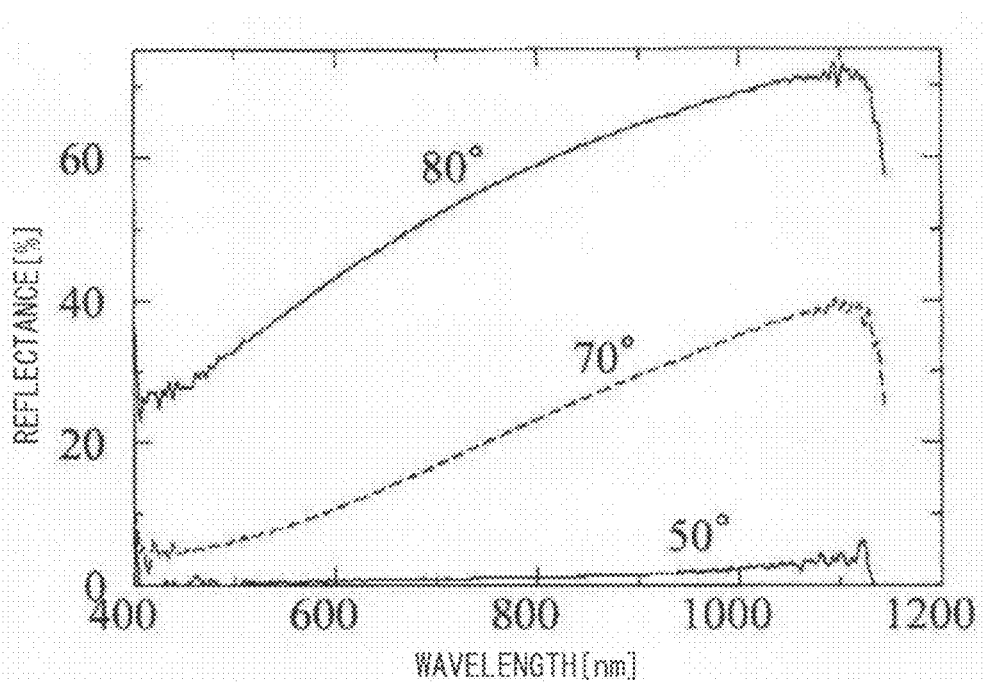
FIG. 17 is a diagram showing a relationship between a processing angle (80°, 70°, 50°) by an ion beam and a reflectance of a GC substrate.
Figure 18:
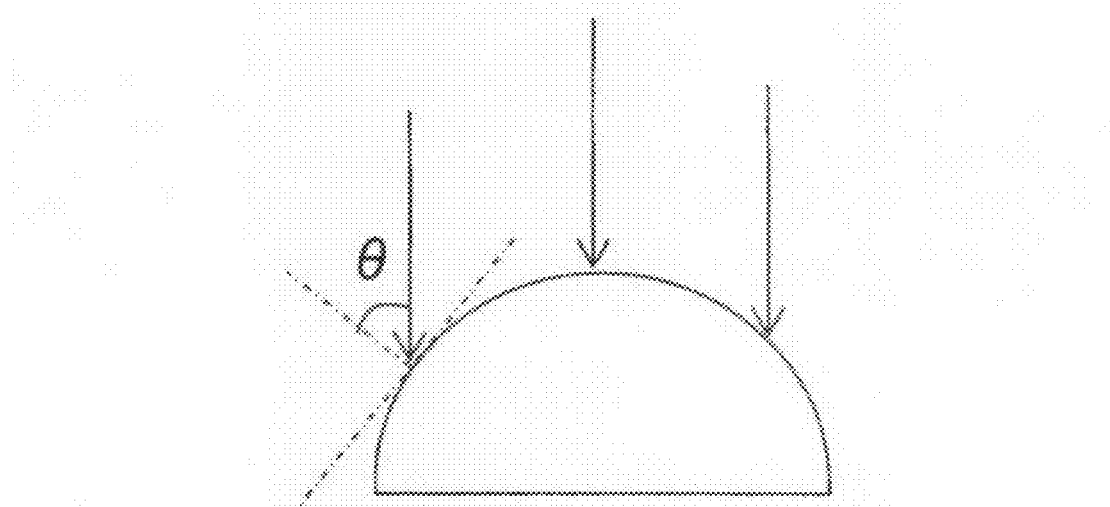
FIG. 18 is an schematic view of explaining a processing angle θ by ion beam processing.

The processing condition is as follows.
Acceleration voltage: 500 [V]
Processing time: 45 [min]
Extractor: 10
Gas flow rate: 3.0 [SCCM]
Current density: 1.20 [mA/cm$^2$]
Ion emission: 11.8 [mA]
Rotational speed of holder: 0 [rpm]
Microwave output: 100 [W]
Distance (L) between beam extracting electrode and GC substrate: 11.7 cm FIG. 17 shows a result of measuring the reflectance when the processing angle is set respectively to 80°, 70° and 50°. When the processing angle becomes equal to or smaller than 60°, the reflectance becomes extremely low, and particularly, when the processing angle is equal to or lower than 40°, substantial non-reflection is achieved. Thus, when the processed face of the GC substrate is not a plane, for example, when the surface of the GC base member has a roll shape such as that shown in FIG. 18, the GC substrate can be processed to achieve substantial non-reflection without inclining the GC substrate at a portion at which the angle (processing angle θ) of incidence of an ion beam and a perpendicular line of the processed face of the GC substrate is equal to or smaller than 60°, preferably, equal to or smaller than 40°. Further, when a portion at which the processing angle θ is to exceed 40° is present, after processing is performed in which the ion beam is not irradiated to the portion at which the processing angle θ is to exceed 40°, by processing the unprocessed portion by changing the angle, an anti-reflection structure that achieves near non-reflection can be formed over an entire face.

Further, the reflectance of the GC substrate as processed has the dependence on the processing angle, and therefore, when the GC substrate is inclined to be processed in accordance with the requested reflectance, the anti-reflection structure body having a desired reflectance can also be obtained.

Figure 19:
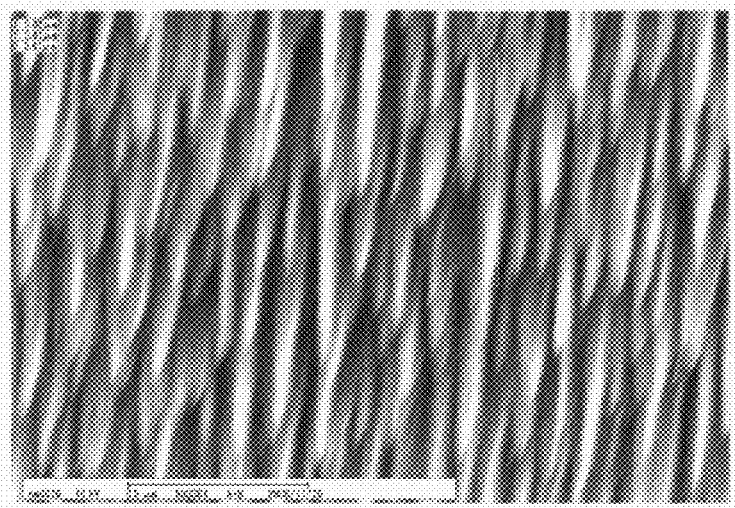
FIG. 19 shows an SEM image of minute recesses and projections (grooves) in an acicular shape formed at a surface of a GC substrate when processed by a processing angle of 80°.

Further, when processing is carried out by ECR at a processing angle exceeding of 60°, for example, at a processing angle of 80°, as is shown in an SEM image of FIG. 19, minute recesses and projections (grooves) in an acicular shape extending in the face direction is formed at the surface of the GC substrate. Therefore, by carrying out transfer using this as a mold, a structure like a rough skin by which a fluid resistance of the surface is reduced can be formed in the transferred member.

[Reproducing Processing Example]

When the transfer to resin or glass is carried out by using as a mold a GC substrate having an anti-reflection structure formed by the invention, it is conceivable that the anti-reflection structure is worn. However, if a non-reflection structure can be reproduced again by ion beam processing by ECR after the wear, the same substrate can be repeatedly used and low cost can be achieved.

Hence, after forming an anti-reflection structure including a minute acicular pattern by processing one face of a GC substrate by ECR, the anti-reflection structure is destroyed by mechanically collapsing the acicular pattern. Next, after carrying out ultrasonic wave cleaning, processing similar to that of the first time is applied to the same face of the GC substrate and an anti-reflection structure is formed.

Figure 20:
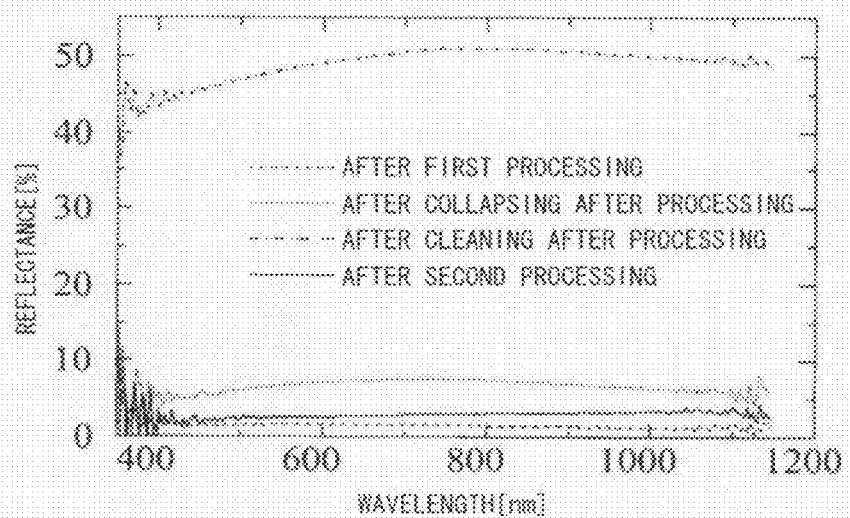
FIG. 20 is a diagram showing a reflectance of a GC substrate measured in a reproducing processing example.

A processing condition at a first time and a second time by ECR is as follows.
Acceleration voltage: 500 [V]
Processing time: 30 [min]
Extractor: 0
Gas kind: oxygen
Gas flow rate: 3.0 [SCCM]
Ion emission: 14.0 [mA]
Rotational speed of holder: 0 [rpm]
Microwave output: 100 [W]
Current density: 1.68 [mA/cm]
Distance (L) between beam extracting electrode and GC substrate: 11.7 cm A reflectance is measured respectively after the first transfer, after destroying the acicular pattern, after the ultrasonic cleaning, and after the second processing. FIG. 20 shows a result of measuring the reflectance. As in shown in the drawing, although the reflectance is increased by destroying the anti-reflection structure of the GC substrate provided by the first processing, an anti-reflection structure having a reflectance similar to that by the first processing is provided by the second processing (reproducing processing).

[Dependence on Low Acceleration Voltage and Processing Time]

A GC substrate (1 mm square) is processed under the following condition by using the ECR apparatus shown in FIG. 1.
Acceleration voltage: 300 [V]
Processing time: 3 minutes through 30 minutes (at intervals of 3 minutes)
Gas flow rate: 2.0 [SCCM]
Gas kind: O$_2$
Current density: 0.6 [mA/cm$^2$]
Ion emission: 12.9 [mA]

Figure 21:
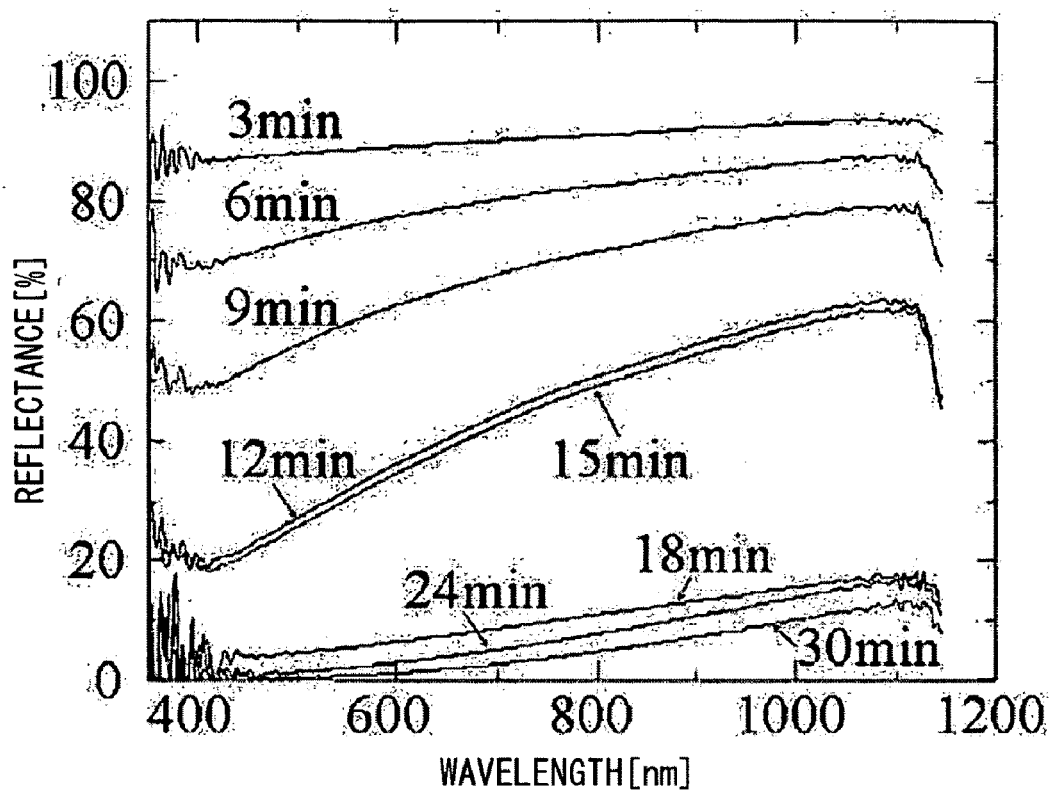
FIG. 21 is a diagram showing a relationship between processing time and a reflectance at a low acceleration voltage (300 V).

An image of a surface of the GC substrate as processed is taken by SEM and a reflectance is measured. FIG. 21 shows a result of measuring a reflectance. Further, reflectances in cases of processing time of 21 minutes and 27 minutes are omitted.

Figure 22:
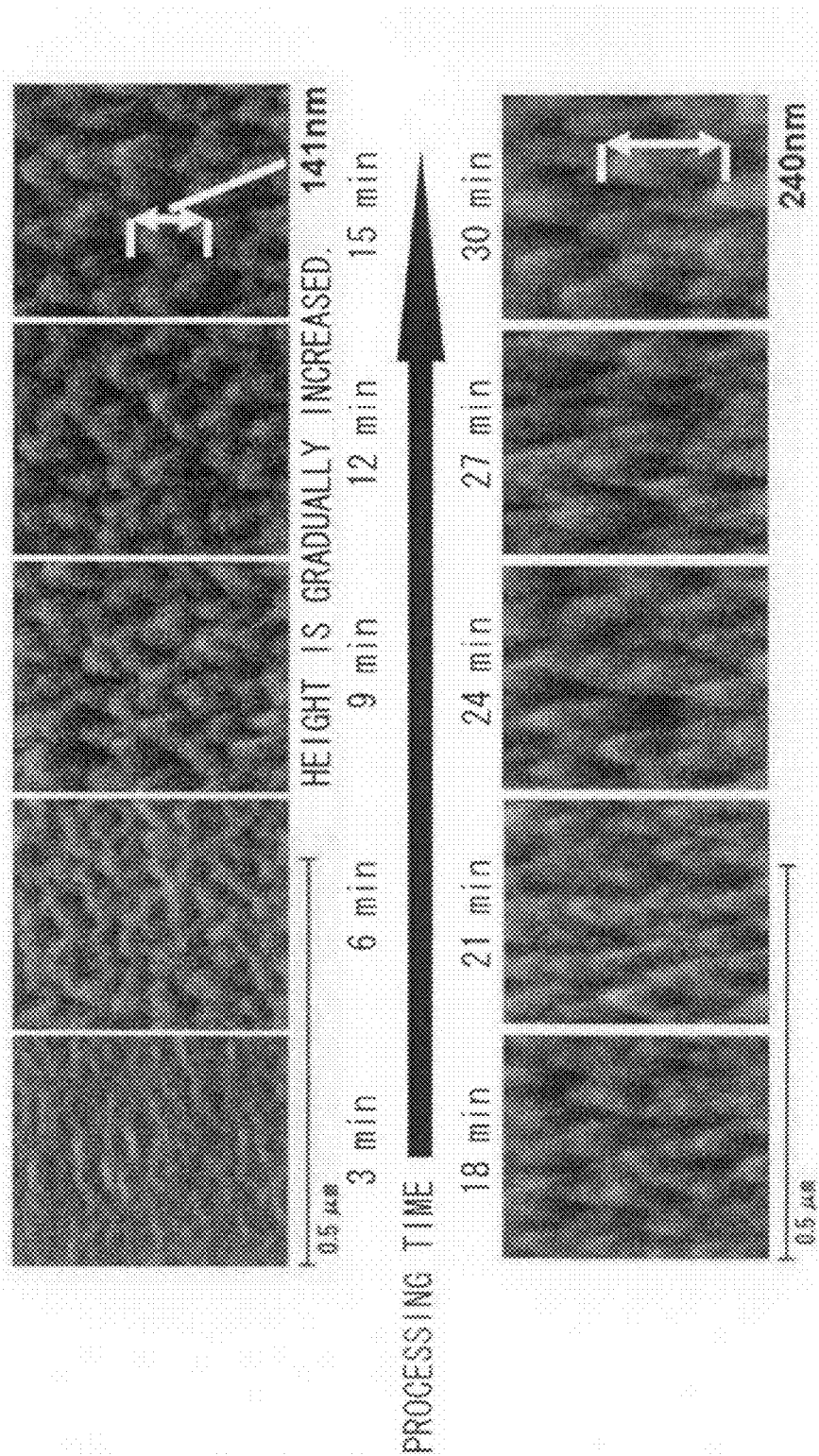
FIG. 22 shows SEM images of shapes formed by changing processing time at an acceleration voltage of 300 V.

FIG. 22 shows a result of observing a shape produced by changing processing time at an acceleration voltage of 300 V Until processing time of 15 minutes, a projection formed at GC substrate surface becomes rapidly thin and a behavior of progressing to form the projection at a high density is known. Although reflectance is reduced together therewith, when the processing time is equal to or longer than 18 minutes, there is little change in the shape of the projection, and reduction in reflectance slows. However, it is thought that the reflectance amount can be brought closer to non-reflection by processing for a long time. Further, when observing processing of the GC substrate at 300 V, an apex angle of the shape is seen to widen in comparison with an acicular structure with 500 V through 1000 V. When the apex angle widens, although an anti-reflection function weakens, a strength of a mold for transfer is increased. Further, since recesses and projections are reversed in transfer, it may be effective to use GC processed at 300 V by which a high strength can be expected for transfer, even though the apex angle becomes slightly widened. Further, a porous member in which circular column shapes are aligned, for example, a porous member formed by plasma treatment of anodically oxidized aluminum, silicon, glass, or a porous member formed by wet etching or the like of silicon, generally engages with a resin upon transfer of the resin, since the porous member is not tapered, making transfer difficult. In contrast, the minute projections on the GC substrate according to the invention are tapered, and therefore, the minute projection is a shape advantageous for transfer. Further, although transfer to a resin can be performed when a porous member is provided with a low aspect ratio, a high aspect ratio of an original porous member is not fully utilized and an anti-reflection effect is also weakened.

Further, an apex angle of a projection of GC processed at 300 V is 11.9° through 20.1°, and an apex angle of the projection of GC processed at 500 V is 3.3° through 17.37°. Even in processing at 300 V, the apex angle is in a range of significantly achieving an anti-reflection effect (equal to or lower than 37.8°) and it is known that a shape controllability is improved by being operated in the direction of increasing the apex angle.

[Shape Dependence on High Acceleration Voltage]

A GC substrate is processed under the following condition by using the ECR apparatus shown in FIG. 1.

Figure 23:
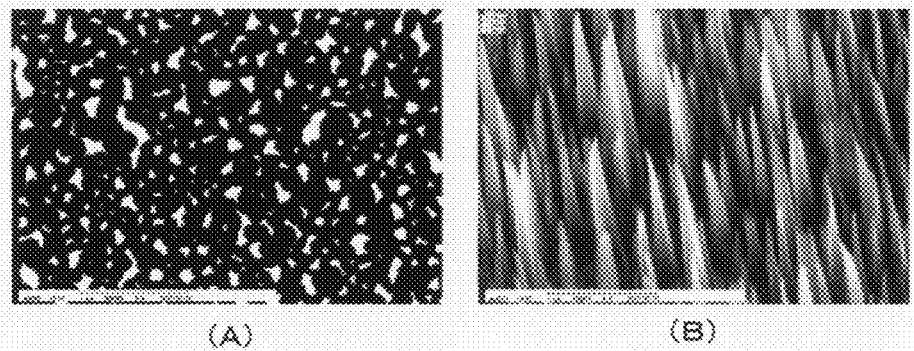
FIG. 23 shows SEM images of an anti-reflection structure body when subjected to ECR processing for 30 minutes at a high acceleration voltage (1000 V). (A) is an SEM image taken from a front side, and (B) is an SEM image taken from an angle.
Figure 24:
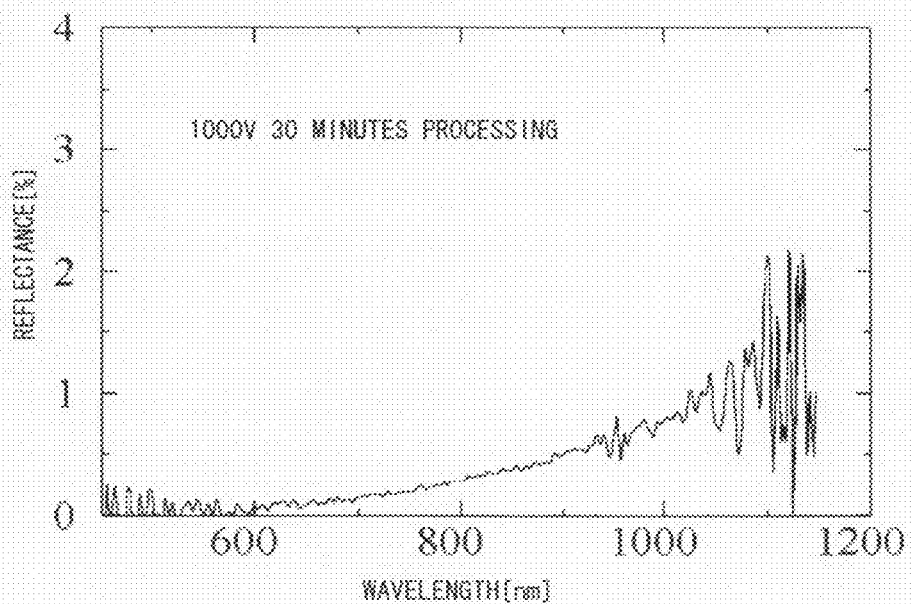
FIG. 24 is a diagram showing a reflectance of the anti-reflection structure body shown in FIG. 23.

Acceleration voltage: 1000 V
Gas kind: $O_2$
Gas flow rate: 2.0 [SCCM]
Processing time: 30 min An image of a surface as processed is taken by SEM and a height and a pitch of a projection are measured. Further, a reflectance is measured. FIG. 23 shows an SEM image and FIG. 24 shows a reflectance. The height of the projection is 2.18 μm, the pitch is 0.46 μm. The projection at the surface of GC is considerably sharpened and it is known that the pitch (distance between tips of acicular projections contiguous to each other) is widened. Further, the reflectance is reduced to be equal to or lower than 1% in a visible light region.

[Dependence of Shape on Ar Gas]

A GC substrate is processed under the following condition by using the ECR apparatus shown in FIG. 1.

Figure 25:
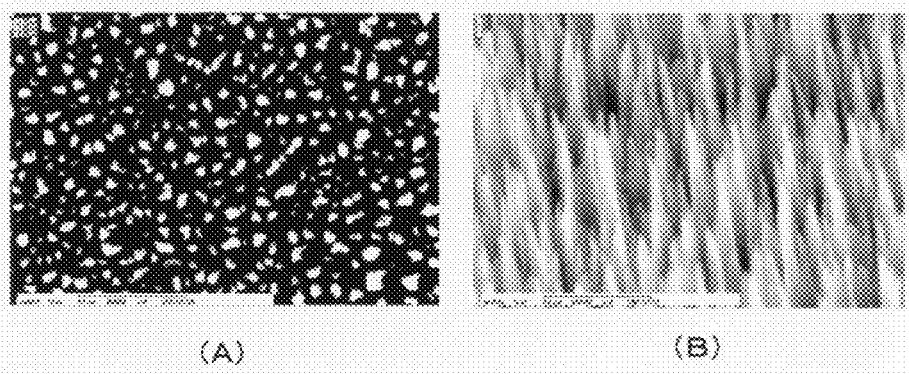
FIG. 25 shows an SEM image of an anti-reflection structure body when subjected to ECR processing using a mixed gas of argon and oxygen. (A) is an SEM image taken from a front side, and (B) is an SEM image taken from an angle.
Figure 26:
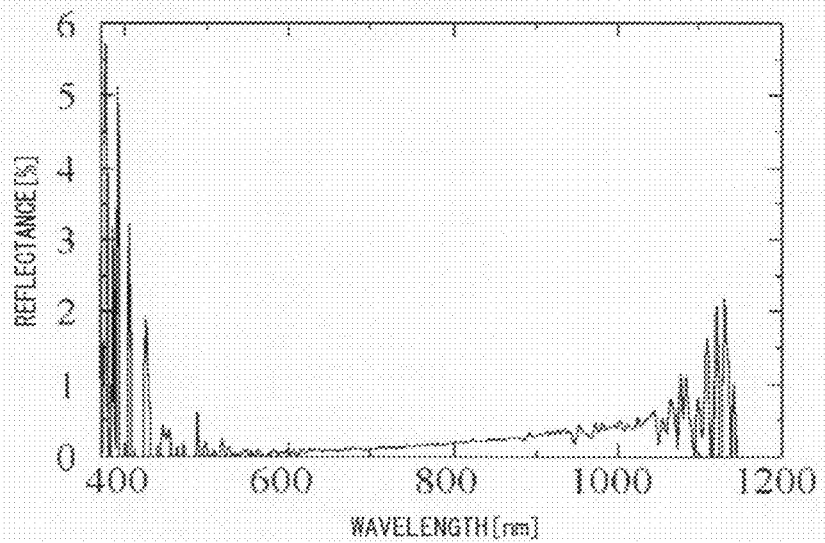
FIG. 26 is a diagram showing a reflectance of the anti-reflection structure body shown in FIG. 25.

Acceleration voltage: 500 V
Gas kind: $O_2$+Ar
Gas flow rate: $O_{2=1.80}$ [SCCM], Ar=0.20 [SCCM]
Processing time: 30 min An image of a surface as processed is taken by SEM, and a height and a pitch of a projection are measured. Further, a reflectance is measured. FIG. 25 shows an SEM image and FIG. 26 shows a reflectance. The height of the projection is 0.86 μm and the pitch is 0.15 μm. Although the height of the projection is lower than that in a case of using an acceleration voltage of 1000 V, a processing time of 30 minutes, and oxygen, a low reflectance is realized since the pitch is small.

From the above-described result, when the GC substrate is subjected to ECR processing, by controlling acceleration voltage, a mixture ratio of Ar, and processing time, it is possible to form a pattern shape closer to non-reflection, and also a so-to-speak inverse non-reflection pattern shape which is capable of forming a pattern shape closer to non-reflection when transferred to a material for transfer.

[Example of Producing Mold Utilizing Vapor Deposition]

An anti-reflection structure is formed by processing a surface of a GC substrate at an acceleration voltage of 500V and processing time of 45 minutes and then gold deposition (thickness of 220 nm) is carried out on the processed surface. After dropping a photo-curable resin (PAK-01, made by Toyo Gosei Co., Ltd.) onto a gold deposition face of the GC substrate, slide glass is pressed thereto. The photo-curable resin serves as an adhering agent. The press pressure is 1.5 MPa, and press time is 60 seconds. Successively, UV light is irradiated (2 J/cm$^2$) from a side of the slide glass. Thereby, a gold pattern (mold) is transferred onto the slide glass.

When a relative reflectance of the gold anti-reflection structure in which the anti-reflection structure of the GC substrate is reflected as described above is measured by regarding a gold surface as 100%, the relative reflectance is about 2% and a mold realizing the anti-reflection function is obtained.

In this way, a mold having the anti-reflection function can be obtained by forming a metal film on the anti-reflection structure face of the GC substrate by vapor deposition or the like, coating an adhering agent thereon, and releasing the film.

[Comparative Experiment Example Using Dot Mask]

—ICP (Inductive Coupled Plasma) Processing—

Figure 27:
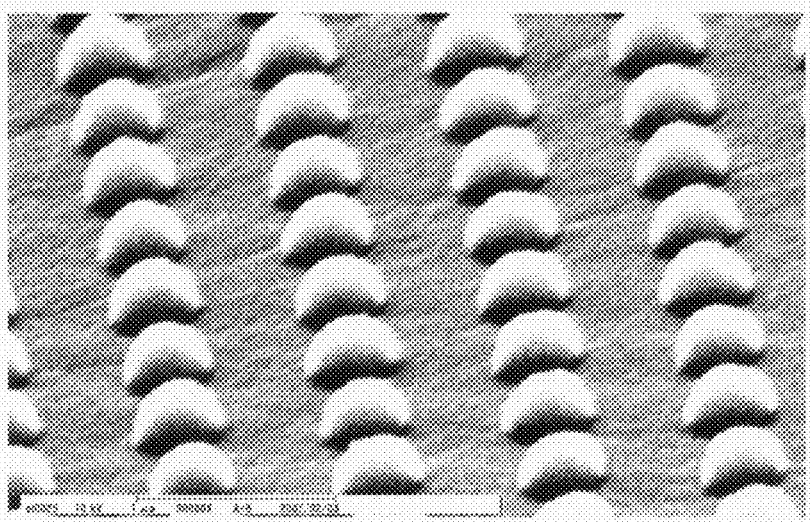
FIG. 27 is an SEM image showing dots pattern formed on a GC substrate.
Figure 28:
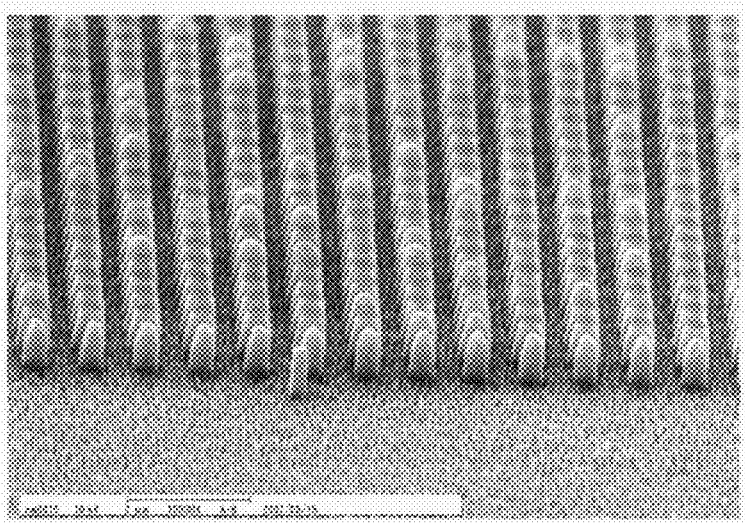
FIG. 28 shows an SEM image after the GC substrate provided with dots shown in FIG. 27 is subjected to ICP processing.

Dots of a diameter 360 nm are provided on GC substrate (1 cm square) by electron beam drawing at intervals of 360 nm by using a negative resist (HSQ (Hydrogen Silsesquioxane) "FOx-14", made by Dow Corning Toray Corp., Ltd.). FIG. 27 shows a dot pattern formed on GC. Thereby, it is known that the height of the mask is 300 nm. The GC substrate is subjected to ICP processing under the following condition by using an ICP plasma apparatus (made by Elionix Inc., EIS700) by constituting the mask by the HSQ dot. FIG. 28 shows an SEM image thereof. A height of a projection in a shape of a circular column formed by ICP processing is 1060 nm. A reflectance of the processed surface is measured using a GC mirror face as a reference after processing.

ICP high frequency power: 500 W
Substrate bias: 100 V
Gas kind: $O_2$
Gas flow rate: 50 SCCM
Processing time: 3 min —ECR Processing—

After the ICP processing, ECR processing is carried out under the following condition.

Figure 29:
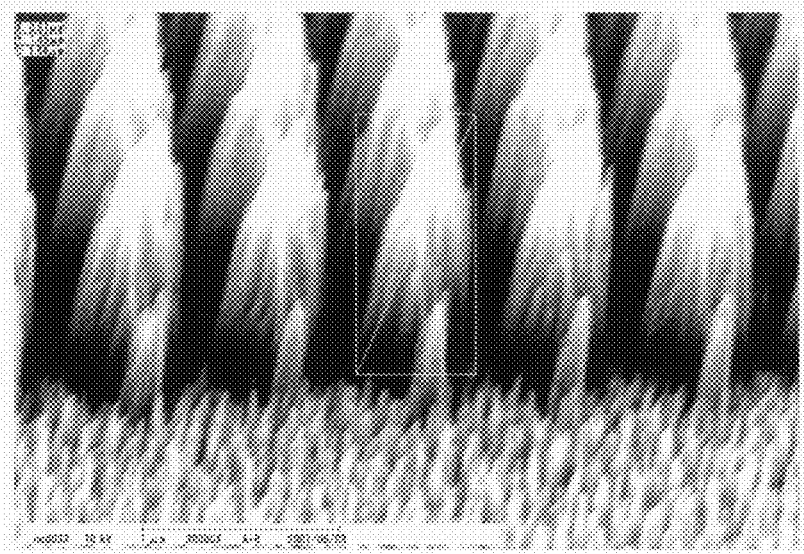
FIG. 29 is a perspective view taken from an angle of an anti-reflection structure body after having been subjected to ICP processing+ECR processing using a dot mask.

FIG. 29 is an SEM photograph after ECR processing. A projection a tip of which is sharpened is formed. The height of the projection is 2.05 μm. After the ECR processing, a reflectance of the processed surface is measured using a GC mirror face as a reference.

Figure 30:
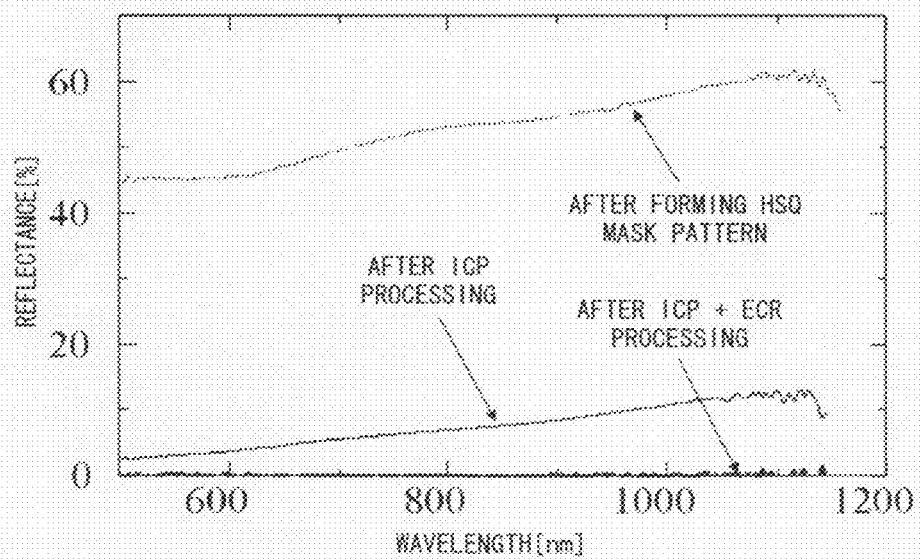
FIG. 30 is a diagram showing a reflectance after ICP processing using the dot mask and a reflectance after ECR processing.

Acceleration voltage: 300 V
Gas kind: $O_2$
Gas flow rate: 2.0 SCCM
Processing time: 60 min FIG. 30 shows reflectances of the GC substrate after forming HSQ mask, after the ICP processing, and after the ECR processing. Although in the case of the HSQ mask on the GC substrate, the height of the mask pattern in the shape of the circular column is small, and therefore, the anti-reflection effect is not achieved, even in the similar circular column pattern, when the circular column pattern is deepened after ICP processing, the anti-reflection effect equal to or smaller than 10% is achieved in the visible light region. Further, in the case of ICP processing, owing to an anisotropic plasma etching, processing having an excellent verticality is constituted. Therefore, ICP can be regarded to be suitable for carrying out processing in the shape of the circular column.

On the other hand, after processing by ECR, the projection of GC is sharpened, and is succeeded to produce the non-reflection structure. The anti-reflection effect equal to or smaller than 1% is achieved in the visible light region. This is conceived to derive from a sputtering phenomenon owing to oxygen ion beam impact. In the case of the sputtering phenomenon, generally, the processing speed is increased by an angle of incidence of 40 degrees through 60 degrees. Here, in a vicinity of a top processed in the shape of the circular column by ICP, at an end portion, the angle of incidence is increased, and the processing speed of the portion is increased. On the other hand, the processing speed is slow by a portion of the angle of incidence of 0 degree (top flat face of circular pillar). As a result, it is thought that processing is progressed from a side wall on an upper portion of the circular pillar, a flat portion is gradually reduced and the pillar is sharpened.

A tapering shape is important for a condition of a non-reflection structure, since change in refractive indices between air and a medium continuously occurs and thereby return of incident light is prevented. It is known from the experiment example that by only the shape of the circular column, the effect is inconsiderable and a complete non-reflection property is not achieved. Further, generally, in reactive plasma processing, a phenomenon of roughening a surface self-organizingly is brought about frequently. For example, the phenomenon is brought about when silicon is processed by a gas of fluorine species or when a carbon species (diamond, CVD diamond or the like) material is processed by a gas of oxygen species. According thereto, owing to a high reactivity, a portion easy to process and a portion difficult to process occur at a surface by some influence, as a result, a surface in a porous shape (circular pillar shape) is produced. Some influence is that owing to a state of polishing of the surface, a state of crystal, a structure of a material, or adherence of dust or stain by a gas composition. As a cause of the self-organized non-reflection structure in GC, it is thought that owing to the structure of GC, there occurs a portion easy to be processed and a portion difficult to be processed by oxygen at a pitch less than 100 nm, thereafter, sharpening is progressed by processing to remove by oxygen ion beam and sputtering phenomenon. This is also understood from the fact that the shape differs between when the acceleration voltage is 300 V and when the acceleration voltage is equal to or higher than 500 V. That is, it is regarded that at 300 V, a degree of plasma processing is strong (which is thought to be near to the shape of processing by ICP or RIE), sputtering is inconsiderable. It is thought that from 500 V, sharpening is started by the influence of sputtering. In this way, it can be regarded that the non-reflection structure can be formed by a combination of a material of GC (which determines a density of processing points and a pitch of a sharpening structure) and oxygen ion beam processing (which carries out processing of GC and sharpening by sputtering).

Further, after carrying out ICP processing to other GC substrate, Ar is used as a gas kind, and ECR processing is carried out under the following condition.

Acceleration voltage: 1000 V
Gas kind: Ar
Gas flow rate: 0.55 SCCM
Processing time: 15 min Also in this case, sharpened projections are formed at positions in correspondence with dots on a surface of a GC substrate. Ar gas has no reactivity to carbon as a material of constituting GC. Sharpening can be carried out also by the Ar ion beam, and therefore, it can be regarded that the sputtering phenomenon contributes to the sharpening. In the case of the processing apparatus such as ICP, RIE or the like, reactive plasma is mainly used, self bias is low, a sputtering phenomenon is difficult to occur, and therefore, it is thought that a tapered non-reflection structure cannot be produced.

Industrial Applicability

The anti-reflection structure according to the invention is provided with extremely high anti-reflection function, the structure per se can be utilized as the anti-reflection member, by carrying out transfer to a member having a high melting point (softening point) such as a quartz glass substrate or the like by using the whole of the anti-reflection structure as a mold, the structure can significantly contribute to fabrication of a portable telephone, a personal computer or the like having a display near to non-reflection.

Further, an anti-reflection structure according to the invention also has a high hydrophilic property as well as the anti-reflection effect, and therefore, the structure can be also utilized in manufacturing a floor member which is swiftly dried in, for example, a bathroom or the like.

Further, the following application example is conceivable for the anti-reflection structure according to the invention.

A cell culture sheet, a DNA separating structure, a control of a wettability in micro TAS or the like utilizing a minute projection structure is conceivable.

An adhering force is increased by an anchor effect (an interface is solidly coupled by entangling recesses and projections) of a minute projection structure, and therefore, when the structure can be transferred to resin or the like, a face increasing the adhering force can be produced.

By transferring a minute projection structure, a hydrophilic property, a water repellant property, a fast drying property or the like can be provided, for example, a determination of odor utilizing the fast drying property, an application to floor or a wall face of a bathroom or the like utilizing the water repellant property (wetting prevention) or the like is conceivable.

Further, by utilizing an acicular shape of a minute projection structure, an application to an AFM needle, or application to a field discharge element, a fuel cell, a material for DDS is also conceivable.

Further, by utilizing an anti-reflection structure of a GC substrate, it is conceivable to apply the structure to a sample of calibrating a reflectance of a spectroscope, or a portion of removing stray light at inside of an optical apparatus.

Although an explanation has been given of the anti-reflection structure or the like according to the invention as described above, the invention is not limited to the above-described embodiment and an example. For example, the apparatus used in producing the anti-reflection structure according to the invention is not limited to the ion beam processing apparatus of the ECR type shown in FIG. 1, but other processing apparatus may be used so far as the anti-reflection structure body formed with a cluster of minute projections having a shape with a diameter that contracts toward a tip thereof such as an acicular shape, a conical shape, a polygonal cone shape or the like can be formed at a surface of a glassy carbon substrate.

Further, although explanation has been given of the anti-reflection structure body using glassy carbon and the method of producing the same in the embodiment, a similar anti-reflection structure body can also be produced using a material having a heat resistance, a mechanical strength etc. equivalent to or higher than that of glassy carbon. For example, by applying ion beam processing or the like to a substrate formed of a material made of carbon such as diamond and having a high mechanical strength, a surface of the substrate can be provided with an anti-reflection structure formed with a cluster of minute projections each having a shape with a diameter that contracts towards a tip thereof, such as an acicular shape, a cone shape or the like.

| DESCRIPTION OF REFERENCE NUMERALS AND SIGNS | |
| --- | --- |
| 10 | ECR type ion beam processing apparatus |
| 12 | holder |
| 14 | reaction gas introducing pipe |
| 16 | plasma generating chamber |
| 18 | extractor |
| 20 | electromagnet |
| 22 | beam extracting electrode |
| 24 | Faraday cup |
| 26 | raw material substrate |
| 30 | projection |
| 32 | anti-reflection structure |
| 44 | optical member |
| H | height |
| P | pitch |
| D | maximum diameter |

The disclosure of Japanese Patent Applications Nos. 2006-217577 and 2007-39340 is incorporated herein by reference in its entirety.

All of references, patent applications, technical standards described in the specification are incorporated in the specification by reference to a degree the same as that of a case specifically and individually describing incorporation of individual references, patent applications, and technical standards by reference.

The invention claimed is:

1. An anti-reflection structure body comprising a base member which is made of glassy carbon, at a surface of which is formed an anti-reflection structure comprising a cluster of minute projections having:
   an acicular shape or a cone shape with a diameter that contracts towards a tip thereof;
   an average maximum diameter that falls in a range of from 80 nm to 220 nm;
   an average pitch that falls in a range of from 120 nm to 220 nm; and
   a tip portion angle that is smaller than 37.8°.

2. The anti-reflection structure body according to claim 1, wherein each of the minute projections has a shape with a diameter that contracts from the root thereof towards a tip.

3. The anti-reflection structure body according to claim 1, wherein an average height of the minute projections falls in a range of from 200 nm to 3000 nm.

4. The anti-reflection structure body according to claim 1, wherein large projections, each having a width and a height 5 times greater or more than a width and a height of each of the minute projections forming the anti-reflection structure, and having a shape with a diameter that contracts towards a tip thereof, are interspersed at the surface of the base member.

5. A method of producing the anti-reflection structure body according to claim 1, wherein a base member made of glassy carbon is used, the base member is mounted to an ion beam processing apparatus of an ECR type, the base member is subjected to an ion beam processing by using a gas including oxygen, and thereby, the anti-reflection structure comprising a cluster of minute projections each having an acicular shape or a cone shape with a diameter that contracts towards a tip thereof is formed at a surface of the base member.

6. The method of producing the anti-reflection structure body according to claim 5, wherein a face of the base member made of the glassy carbon subjected to the ion beam processing is polished.

7. The method of producing the anti-reflection structure body according to claim 5, wherein a shape and a pitch of the minute projections formed at the surface of the base member are controlled by controlling at least any one of an acceleration voltage, processing time, and a gas flow rate when the base member made of the glassy carbon is subjected to the ion beam processing.

8. The method of producing the anti-reflection structure body according to claim 7, wherein the acceleration voltage is set to be 300 V or higher and the processing time is set to be 18 minutes or longer.

9. The method according to claim 5, wherein the ion beam processing is carried out after interspersing a mask material for forming large projections on the surface of the base member made of the glassy carbon.

10. A method of producing an optical member having an anti-reflection structure at a surface thereof, comprising: using the anti-reflection structure body according to claim 1 and transferring the anti-reflection structure formed at the surface of the anti-reflection structure body onto a surface of the optical member.

11. A method of producing an optical member having an anti-reflection structure at a surface thereof comprising: producing a mold having an anti-reflection structure transferred from an anti-reflection structure body by subjecting the anti-reflection structure body according to claim 1 to plating or by forming a metal vapor deposition film thereon, and transferring the anti-reflection structure onto a surface of the optical member by using the mold.

* * * * *